United States Patent
Thyagarajan et al.

(10) Patent No.: US 12,253,788 B2
(45) Date of Patent: Mar. 18, 2025

(54) GATE-TUNABLE ENTANGLED PHOTON PAIR GENERATION

(71) Applicant: Palo Alto Research Center Incorporated, Palo Alto, CA (US)

(72) Inventors: Krishnan Thyagarajan, Sunnyvale, CA (US); Krishna Thyagarajan, Bengaluru (IN)

(*) Notice: Subject to any disclaimer, the term of this patent is extended or adjusted under 35 U.S.C. 154(b) by 340 days.

(21) Appl. No.: 18/045,189

(22) Filed: Oct. 10, 2022

(65) Prior Publication Data

US 2024/0118586 A1   Apr. 11, 2024

(51) Int. Cl.
   *G02F 1/39*   (2006.01)
   *G02F 1/35*   (2006.01)

(52) U.S. Cl.
   CPC ............ *G02F 1/395* (2013.01); *G02F 1/3548* (2021.01)

(58) Field of Classification Search
   CPC ................................ G06N 10/00; H04B 10/70
   See application file for complete search history.

(56) References Cited

U.S. PATENT DOCUMENTS

| | | |
|---|---|---|
| 6,516,127 B1 | 2/2003 | Fluck et al. |
| 6,914,999 B2 | 7/2005 | Breukelaar et al. |
| 8,837,735 B2 | 9/2014 | Brodsky et al. |
| 8,861,735 B2 | 10/2014 | Brodsky et al. |
| 9,632,216 B2 | 4/2017 | Han et al. |
| 10,718,990 B2 | 7/2020 | Koste et al. |
| 2009/0028340 A1* | 1/2009 | Trifonov ............... H04B 10/70 380/278 |
| 2012/0063769 A1* | 3/2012 | Brodsky ............ H04Q 11/0005 398/25 |
| 2017/0031183 A1 | 2/2017 | Han et al. |
| 2019/0324179 A1 | 10/2019 | Thyagarajan et al. |

FOREIGN PATENT DOCUMENTS

CN   1564036 A  *  1/2005

OTHER PUBLICATIONS

Wang, et al., "Integrated Photonic Quantum Technologies", pp. 1-16.
Kaoru Sanaka, et al. Abstract of "New High-Efficiency Source of Photon Pairs for Engineering Quantum Entanglement", Phys. Rev. Lett 86, 5620—Published Jun. 11, 2001.

(Continued)

*Primary Examiner* — Maurice C Smith
(74) *Attorney, Agent, or Firm* — Jon Gibbons; Fleit Intellectual Property Law

(57) ABSTRACT

An electro-optical modulating device and method that provides efficient control of the nonlinear propagation constant in an optical waveguide are featured. The electro-optical modulating device provides large wavelength tunability of the generated entangled photon pairs in real-time by using an applied external bias voltage. The electro-optical modulating device uses gate-tunable material at locations near the optical waveguide. The application of an external bias voltage creates a variable field-effect which in turn varies the optical dielectric properties of the waveguide. The result is a compact active, highly efficient wavelength-tunable integrated quantum photonic device for tunable entangled photon pair generation using an external bias voltage.

20 Claims, 21 Drawing Sheets

(56) References Cited

OTHER PUBLICATIONS

Konrad, Banaszek, et al., "Generation of correlated photon in controlled spatial modes by downconversion in nonlinear waveguides", Optica Publishing Group, Opt. Lett 26, 1367-1369 (2001).
Martin, "Integrated opotical source of polarization entangled photons at 1310 nm" 2008 Optical Society of America, Jan. 19, 2009, vol. 17, No. 2, Optics Express pp. 1033-1041.
Brendel, "Pulsed Energy-Timed Entangled Twin-Photon Source for Quantum Communication", Phys Rev. Lett. 82, 2594 Published Mar. 22, 1999, Journals/aps.org/prl/abstract/10.1103/PhysRevLett. 82.2594.
Tanzili, "PPLN Waveguide for quantum Communications", arXiv:quant-ph/0107125v1, Jul. 25, 2001. pp. 1-11.
Bharadwai, "Scheme for on-chip verification of transverse mode entanglement using the electro-optic effect", Quantum Optics; 190, 4390, Nonlinear optics, integrated optics; 230,7370 Waveguides, vol. 23, No. 26.
Han, "Complete Complex Amplitude Modulation with Electronically Tunable Graphene Plasmonic Metamolecules", ACS Publications, https://pubs.acs.org/doi/pdf/10.1021/acsnano.9b09277#.
Buchnev, "Electrically Controlled Nonostructured Metasurface Loaded with Liquid Crystal: Toward Multifunctional Photonic Switch", Advanced Optical Materials, www.advopticalmat.de, wileyonlinelibrary. com, Mar. 2015, pp. 674-679.
Dicken, "Frequency tunable near-infrared metamaterials based on VO2 phase transition", 2009 Optical Society of America Sep. 28, 2009 / vol. 17, No. 20 / Optics Express 18330.
Thyagarajan, "Millivolt Modulation of Plasmonic Metasurface Optical Response via Ionic Conductance" www.advmat.de, © 2017 Wiley-VCH Verlag Gmbh & Co. KGaA, Weinheim, pp. 108.
Huang, "Gate-tunable conducting oxide metasurfaces" pp. 1-13.
KTP Wikipedia "Potassium titanyl phosphate", https://en.wikipedia.org/wiki/Potassium_titanyl_phosphate, pp. 1-4.

\* cited by examiner

GATE-TUNABLE ENTANGLED PHOTON PAIR GENERATION

BACKGROUND

The present application generally relates to integrated photonic quantum technologies and, more specifically, to the real-time wavelength tunability of generated entangled photon pairs.

Entangled photon pairs are a critical resource in quantum communication protocols ranging from quantum key distribution to teleportation. The current workhorse technique for producing photon pairs is via spontaneous parametric down conversion (SPDC) in bulk nonlinear crystals.

The generation of entangled photon pairs is important for quantum communication and sensing and forms the basis for the future of most forms of optical communication encryption and ultrasensitive sensors. Current materials and configurations are not largely tunable once designed.

Integrated photonics offers several routes and processes to engineer, coherently manipulate and detect entangled photons for several quantum technologies including communication, sensing, and metrology. Spontaneous parametric down conversion (SPDC) is one such nonlinear optical process that is very useful to have on chip, for its ability to generate entangled photon pairs of signal and idler, from pump photons. Furthermore, being able to tune the desired wavelengths of the output photons from such an integrated photonic device, for example, for active SPDC, will help augment its functionality. Several mechanisms have been routinely exploited to create active optical systems, including using 2D materials, liquid crystals, phase change, ionic movement, and the field-effect.

Current state-of-the-art utilizes the post-generation filtration of the generated entangled photon pairs. This is a lossy and inefficient way to tune the wavelengths. Stated differently, today, the generating entangled photon pairs in the emitter devices is highly constrained in the wavelength space. This constraint or limitation is due to the fundamental material properties of the nonlinear optical device. Stated differently, once the nonlinear emitter device is fabricated, it is constrained by the fundamental material properties constituting the device and the designed configuration.

SUMMARY OF THE INVENTION

Disclosed is an electro-optical modulating device and method that provides efficient control of the propagation constant of the propagating modes in an optical waveguide. Unlike the prior art, the electro-optical modulating device provides large wavelength tunability of the generated entangled photon pairs in real-time by using an applied external bias voltage. The electro-optical modulating device uses gate-tunable material at locations near the optical waveguide. The application of an external bias voltage creates a variable field-effect, which in turn, varies the optical dielectric properties of the waveguide. The result is a compact active wavelength-tunable integrated quantum photonic device for wavelength tunable entangled photon pair generation using an external bias voltage.

One aspect of electro-optical modulating device includes a waveguide of a nonlinear optical material with one or more sides and a refractive index defined by a corresponding propagation constant. The waveguide may be formed from potassium titanyl phosphate (KTP), potassium dihydrogen phosphate (KDP), lithium niobate (LiNbO$_3$), or a combination thereof or any other nonlinear optical crystal.

The electro-optical modulating device further includes a dielectric spacer surrounding one or more sides of the waveguide. The dielectric spacer may be formed from any high-k dielectric, such as, hafnium oxide (HfO$_2$), magnesium oxide (MgO), silicon dioxide (SiO), or aluminum oxide Al$_2$O$_3$ an aluminum oxide Al$_2$O$_3$, or any other appropriate dielectric material.

The electro-optical modulating device further includes a tunable permittivity region with a certain carrier density surrounding the dielectric spacer. The tunable permittivity region may be formed from a conductive oxide, a transparent conductive oxide, field-effect material, electro-optic material, thermo-optic material, 2D-material, or a combination thereof.

In another example, the tunable permittivity region is one of a transparent conductive oxide (TCO), an indium tin oxide (ITO), an indium zinc oxide (IZO), indium zinc oxide (IVO) zinc oxide an aluminum zinc oxide (AZO), a gallium zinc oxide (GZO), an aluminum gallium zinc oxide (AGZO), a gallium indium zinc oxide (GIZO), a transition metal nitride including Titanium nitride (TiN), Zirconium nitride (ZrN), Hafnium Nitride (HfN), and Tantalum nitride (TaN), or a combination thereof.

Based on the application of an electric field, the carrier density in the tunable permittivity region changes. The tunable permittivity region may be formed with various dielectric susceptibility.

A charge depletion layer or accumulation layer is formed adjacent to one or more sides of the waveguide, thereby changing the corresponding propagation constant of the propagating modes due to a modulation of the refractive index.

In yet another example, when operating the waveguide at an epsilon-near-zero (ENZ) regime, the propagation constant is modified. This modification is due to a real part of a permittivity of the tunable permittivity region changing polarity; this in turn changes the signal-idler frequency pair satisfying the quasi-phase matching condition.

The electro-optical modulating device may further include a light emitting structure disposed adjacent to the waveguide that generates entangled photon pairs from pump photons to pass through the waveguide for use with one of quantum sensing, communication, computing, encryption or a combination thereof. The entangled photon pairs may be at a given wavelength.

In still another example, the entangled photon pairs may include one of second-harmonic generation, third-harmonic generation, high-harmonic generation, or a combination thereof. Further, the entangled photons may be entangled based on spatial-modes, state of polarization, frequency-time, energy-time, hyperentangled, angular momentum, a quadrature, or a combination thereof.

BRIEF DESCRIPTION THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
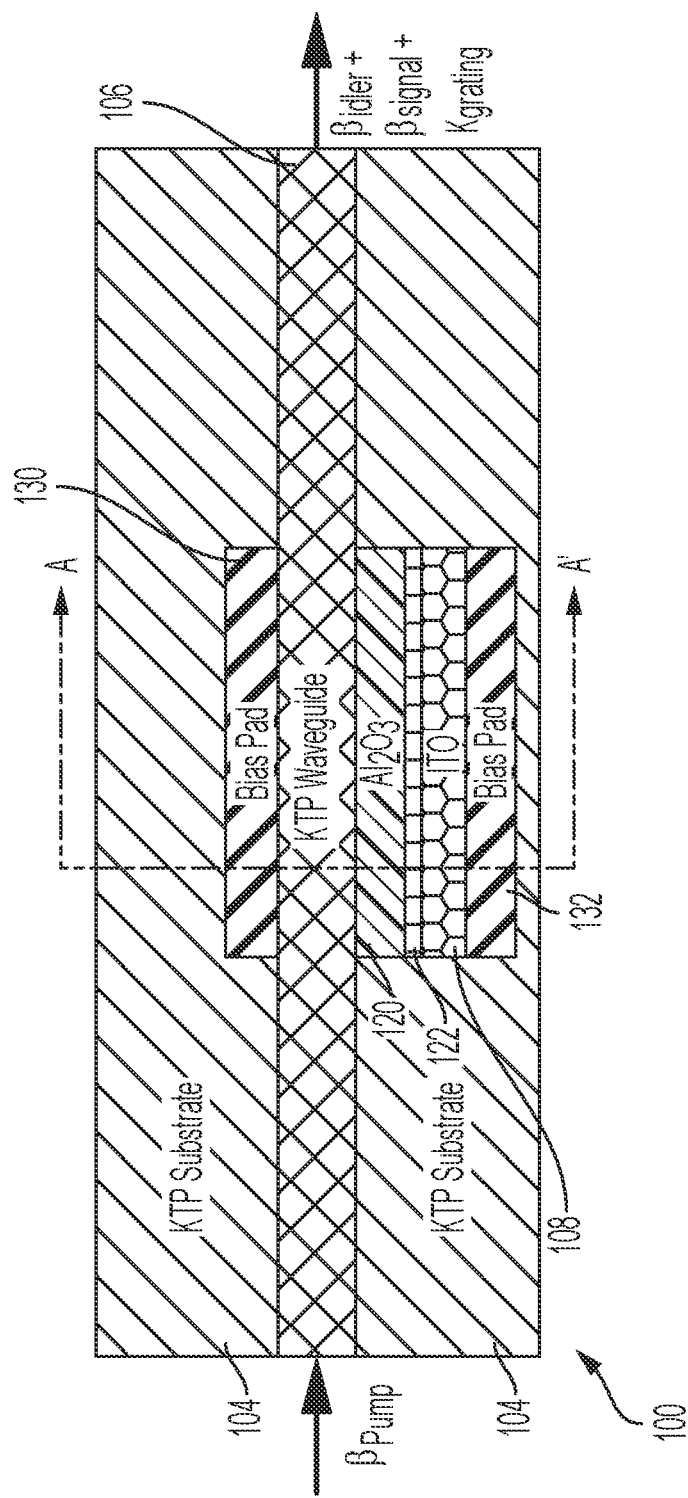
FIG. 1A is a top view, and FIG. 1B a corresponding side view taken along line A-A' of a first example of a waveguide of nonlinear optical material illustrating an accumulation layer due to the locations of the bias pads, the dielectric spacer, and the tunable permittivity region in relation to the waveguide, according to one embodiment of the present invention.

As required, detailed embodiments are disclosed herein; however, it is to be understood that the disclosed embodiments are merely examples and that the systems and methods described below are embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

An electro-optical modulating device that provides a high-efficiency wavelength tunable signal-idler photon pair generation technique is described. The electro-optical modulating device uses index-modulation achieved through an applied external voltage. A very high efficiency is maintained across a broadband wavelength range. This electro-optical modulating device provides a new class of active quantum integrated photonics components based on gate-tunable entangled photon pair generation. The underlying phenomenon utilizes the change in optical dielectric properties of the matter based on the application of the external bias voltage. The current state of the art is highly constrained in the wavelength space; primarily restrained by the fundamental material properties of the device.

The electro-optical modulating device may be used to generate wavelength tunable entangled photon pairs for telecommunication, giving significant control over quantum communication protocols and their practical implementation for secure communication. The users for such an application can thus be the government, banks, or any user-to-user encrypted communication channels. Such generated photons may also be useful for ultrasensitive quantum sensors that utilize entangled photon pairs. Applications can include sensing interference of channels, or signals in low signal-to-noise (SNR) environments. Quantum computing will need the presence of optical channels for carrying qubits—such integrated configurations suggested in this invention can be very useful for high fidelity atom-photon transfer of entanglement, providing high-efficiency quantum computing infrastructure.

Non-Limiting Definitions

The terms "a", "an" and "the" are intended to include the plural forms as well, unless the context clearly indicates otherwise c.

The phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The term "connected" or "coupled" means an element is connected to another element, it can be directly connected or coupled to the other element or intervening elements may be present. In contrast, when an element is referred to as being "directly connected" or "directly coupled" to another element, there are no intervening elements present.

The term "degrees of freedom (DOF)" is an independent parameter of light, including a wavelength, a spatial mode, a polarization, a quadrature, and a component of wave vector.

The term "light" is electromagnetic radiation that includes both visible and non-visible portions of the light spectrum.

The term "layer" or "region" or "portion" or "substrate" used with semiconductor device description is referred to as being "on" or "over" another element, it can be directly on the other element or intervening elements may also be present. In contrast, when an element is referred to as being "directly on" or "directly over" another element, there are no intervening elements present.

High-Level Configuration of Electro-Optical Modulating Device

Example configurations of an electro-optical modulating device provide an integrated photonic circuit that can significantly reduce cost, increase reliability, and reduce size for quantum computing and networking systems. The electro-optical modulating device is a source of entangled photons that includes a photo-lithographically defined waveguide.

The electro-optical modulating device can generate entangled photons in fiber optic or free-space systems without the conventional need for non-integrated collimating lenses and collection optics when a photon pump is focused on a nonlinear crystal. The electro-optical modulating device can be produced for a lower cost by integrating a photon source (e.g., a spontaneous parametric down-conversion (SPDC) source, a spontaneous four-wave mixing (SFWM) source, or the like).

A waveguide of a nonlinear optical material with a core and multilayer cladding with designed refractive index defining the corresponding propagation constant of the propagating modes. In an embodying device, a pump photon propagating in the waveguide and having a propagation constant $\beta_{Pump}$ has its fields propagate partially in the nonlinear material while continuing to be guided in the waveguide—as long as the combined waveguide plus nonlinear material ensure guiding and that the nonlinear material can be placed close enough to the waveguide. In this example, the substrate has no role to play in the modulation. It is the nonlinear optical material that has been modified to also include a waveguide. The effective index of the combined waveguide and nonlinear material can be adjusted by selecting a proper waveguide geometry, allowing for longer interaction lengths for nonlinear mixing. Examples of nonlinear optical materials used for the waveguide include potassium titanyl phosphate (KTP), potassium dihydrogen phosphate (KDP), lithium niobate (LiNbO$_3$), or a combination thereof or any other nonlinear medium.

The electro-optical modulating device further includes a tunable permittivity region with a carrier density surrounding one or more sides of the waveguide in which a carrier density changes based on application of an electric field to form one of a charge depletion layer or accumulation layer adjacent to the one or more sides of the waveguide, thereby changing the corresponding propagation constant due to a modulation of the refractive index.

The electro-optical modulating device further includes a dielectric spacer surrounding one or more sides of the waveguide. The dielectric spacer may be formed from any high-k dielectric, such as, hafnium oxide (HfO$_2$), magnesium oxide (MgO), silicon dioxide (SiO$_2$), or aluminum oxide Al$_2$O$_3$ or any other appropriate dielectric material.

The electro-optical modulating device further includes a tunable permittivity region with a carrier density surrounding the dielectric spacer. The tunable permittivity region may be formed from a conductive oxide, a transparent conductive oxide, field-effect material, electro-optic material, thermo-optic material, 2D-material, or a combination thereof.

In another example, the tunable permittivity region is one of a transparent conductive oxide (TCO), an indium tin oxide (ITO), an indium zinc oxide (IZO), indium zinc oxide (IVO) zinc oxide an aluminum zinc oxide (AZO), a gallium zinc oxide (GZO), an aluminum gallium zinc oxide (AGZO), a gallium indium zinc oxide (GIZO), a transition metal nitride including Titanium nitride (TiN), Zirconium nitride (ZrN), Hafnium Nitride (HfN), and Tantalum nitride (TaN), or a combination thereof.

Based on the application of an electric field, the carrier density in the tunable permittivity region changes. The tunable permittivity region may be formed with various dielectric susceptibility.

A charge depletion layer or accumulation layer is formed adjacent to one or more sides of the waveguide, thereby changing the corresponding propagation constant of the propagation modes due to a modulation of the refractive index.

In yet another example, when operating the waveguide at an epsilon-near-zero (ENZ) regime, the propagation constant is modified. This modification is due to a real part of a permittivity of the tunable permittivity region changing polarity, and a signal-idler frequency pair satisfies a quasi-phase matching condition.

The electro-optical modulating device may further include one or more light emitting structures or photon pump sources $\beta_{Pump}$ disposed adjacent to the waveguide. The photon pump sources are in optical communication with the waveguide. The photon pump sources generate entangled photon pairs from pump photons to pass through the waveguide for use with one of quantum sensing, communication, computing, encryption or a combination thereof. The entangled photon pairs may be at a given wavelength. In other examples, the generation of the entangled photons is a different nonlinear mechanism instead of three-wave-mixing.

Each entangled photon beam exits the waveguide of the nonlinear optical material interaction region satisfying the following condition $\beta_{pump} = \beta_{signal} + \beta_{idler} + K_{grating}$, where $K_{grating}$ is the grating vector corresponding to the quasi-matching nonlinear grating. The entangled photons are denoted as signal beam with propagation constant $\beta_{signal}$ and idler beam with propagation constant $\beta_{idler}$. In one example, wavelength filters can separate the pump, signal, and idler, delivering entangled photon pairs to separate output ports of the photonic integrated circuit. Also, generated photons may occur in greater than pairs.

In other examples, the generation of the entangled photons themselves may involve a different nonlinear mechanism instead of three-wave-mixing. Moreover, the entanglement may be in polarization, energy-time, frequency-time, hyper-entanglement, angular momentum, spatial or any other relevant degree of freedom.

Described now are various configurations of the bias pads, the dielectric spacer, and the tunable permittivity region in relation to the waveguide that produces an accumulation layer in response to an external bias voltage.

First Example Configuration of Electro-Optical Modulating Device

Figure 1B:
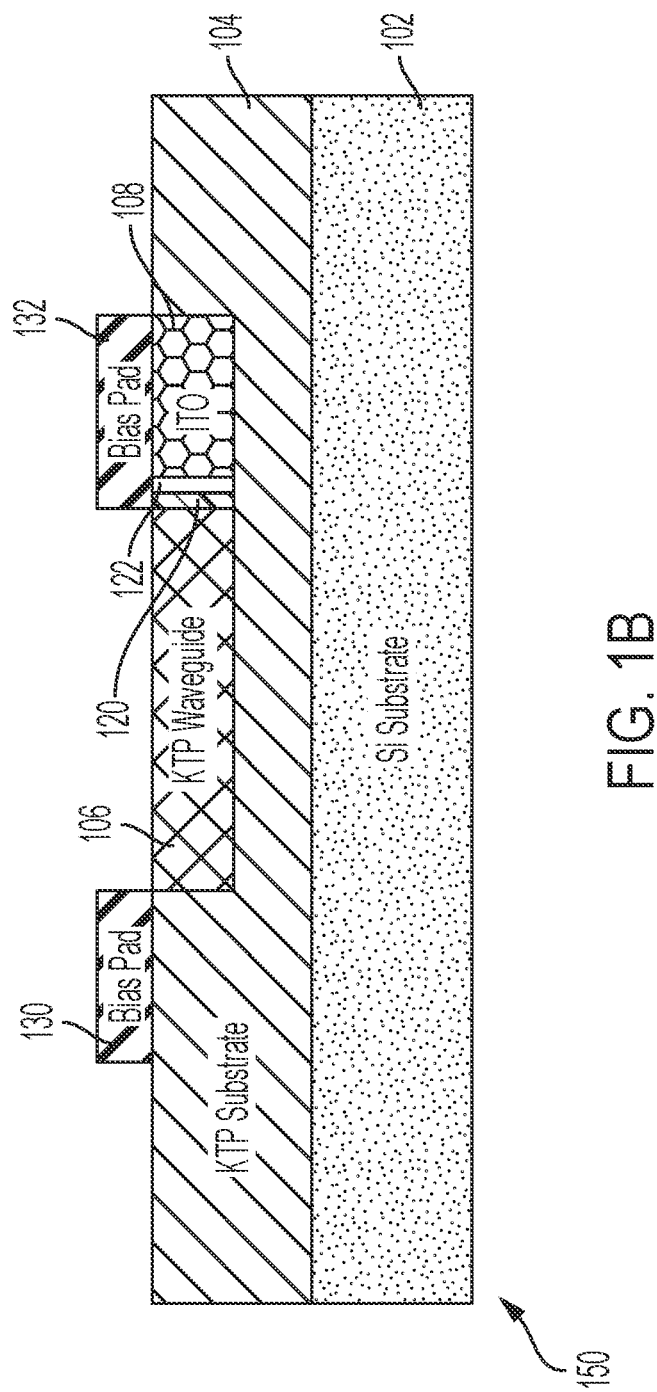

Turning now to FIG. 1A is a top view 100, and FIG. 1B a corresponding side view 150 taken along line A-A' of a first example of a waveguide of nonlinear optical material illustrating an accumulation layer due to the locations of the bias pads, the dielectric spacer, and the tunable permittivity region in relation to the waveguide, according to one embodiment of the present invention.

More specifically, the electro-optical modulating device 100 uses a z-cut x-propagating waveguide of a nonlinear optical material. A photon pump source is used, such as a Type-II SPDC (spontaneous parametric down conversion) process. The photon pump $\beta_{Pump}$ uses quasi phase matching to generate a pair of photons distinguished by their orthogonal polarizations signal and idler. In this example, a thin indium tin oxide (ITO) area 108 is placed proximal to the channel waveguide 106, such that upon the application of an external bias voltage of appropriate magnitude. This external bias voltage provides the ability to tune the pair of wavelengths that satisfy the phase matching conditions, thereby generating wavelength-tunable signal and idler photon pairs of orthogonal polarizations.

For a coupling grating of spatial frequency $K_{grating}$, the phase matching condition to be satisfied is: $\beta_{pump}=\beta_{signal}+\beta_{idler}+K_{grating}$, where $\beta$ represents the propagation constant of the waveguide mode corresponding to the respective frequencies. The propagation constants depend on the waveguide geometry and the refractive indices of the guiding region and the surrounding regions. Upon application of the external bias voltage (not shown) applied to bias pads 130, 132, the field-effect in the ITO area 108 causes the formation of a charge depletion or accumulation layer (depending on the polarity of the bias) 122 due to the large change in the carrier density. Also shown is a dielectric spacer 120, such as an aluminum oxide $Al_2O_3$, disposed between the ITO area 108 and the waveguide 106, as shown. In this first example, each of the bias pads 130, 132 are position not to overlap the waveguide 106.

This results in a net effective change in the refractive index of the layer which in turn results in a change of the propagation constant of the modes. For the case of operation near the epsilon-near-zero (ENZ) regime, the real part of the permittivity of the ITO changes from positive to negative (or vice-versa, i.e., changes from negative to positive depending on how the bias is applied), thereby giving rise to a large effective change in the refractive index. This gives rise to additional significant changes in the waveguide properties altering the propagation constants of the interacting modes, and thus the signal-idler frequency pair satisfying the quasi-phase matching condition.

Furthermore, the disclosed electro-optical modulating device may include additional tuning and optical components, such as, the use of 2D-materials like Graphene, electro-optic effect, thermo-optic effect, which may be used to tune the material properties.

The electro-optical modulating device utilizes materials that are already compatible with and frequently used in semiconductor manufacturing. This provides a lower cost and easier-to-integrate methodology as compared with the current state-of-the-art.

FIG. 2 through FIG. 9 in which like reference numerals refer to identical or functionally similar elements throughout the separate views, and which together serve to further illustrate various embodiments and to explain various principles to form the accumulation layer due to the locations of the bias pads 130, 132, the dielectric spacer 120, and the tunable permittivity region 108 in relation to the waveguide 106.

Second Example Configuration of Electro-Optical Modulating Device

Figure 2A:
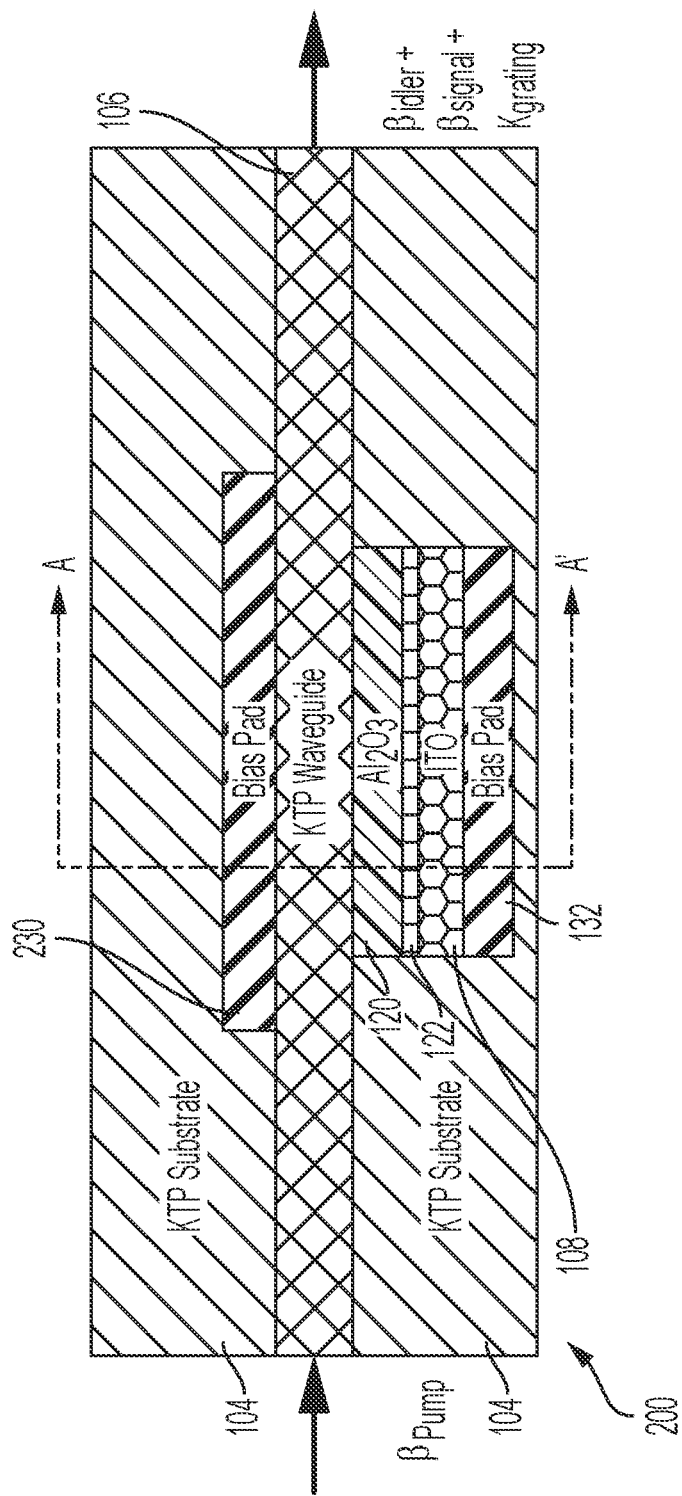
FIG. 2A is a top view, and FIG. 2B a corresponding side view taken along line A-A' of a second example of a waveguide of nonlinear optical material illustrating an accumulation layer due to the locations of the bias pads, the dielectric spacer, and the tunable permittivity region in relation to the waveguide, according to one embodiment of the present invention.
Figure 2B:
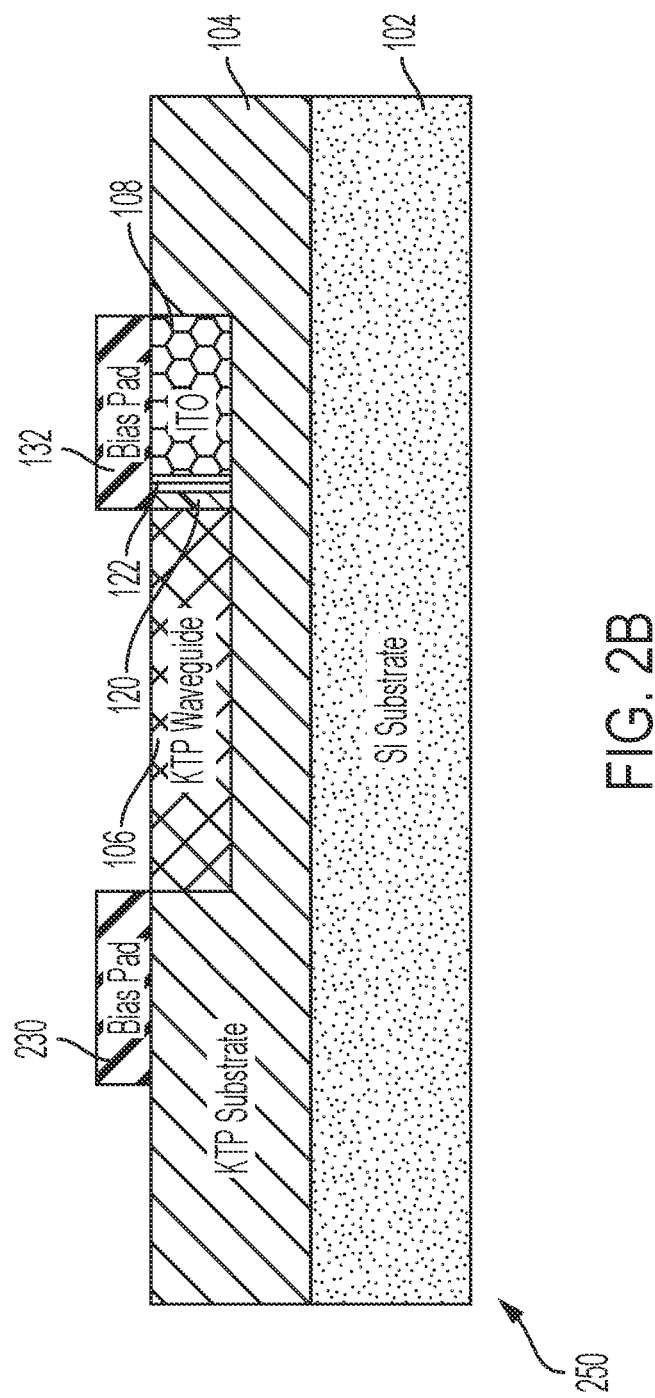

FIG. 2A is a top view 200, and FIG. 2B a corresponding side 250 view taken along line A-A' of a second example of a waveguide of nonlinear optical material illustrating an accumulation layer. The operation principles are identical to those of the first example above. Except in this second example, one of the two bias pads 230, is positioned to extend and overlap the waveguide 106, as shown. The other bias pad 132 is positioned not to overlap the waveguide 106. The effect of the position of the bias pads on the waveguide changes the formation of the accumulation layer when an external bias voltage is applied. A goal is to apply an external bias voltage without shorting the system.

Third Example Configuration of Electro-Optical Modulating Device

Figure 3A:
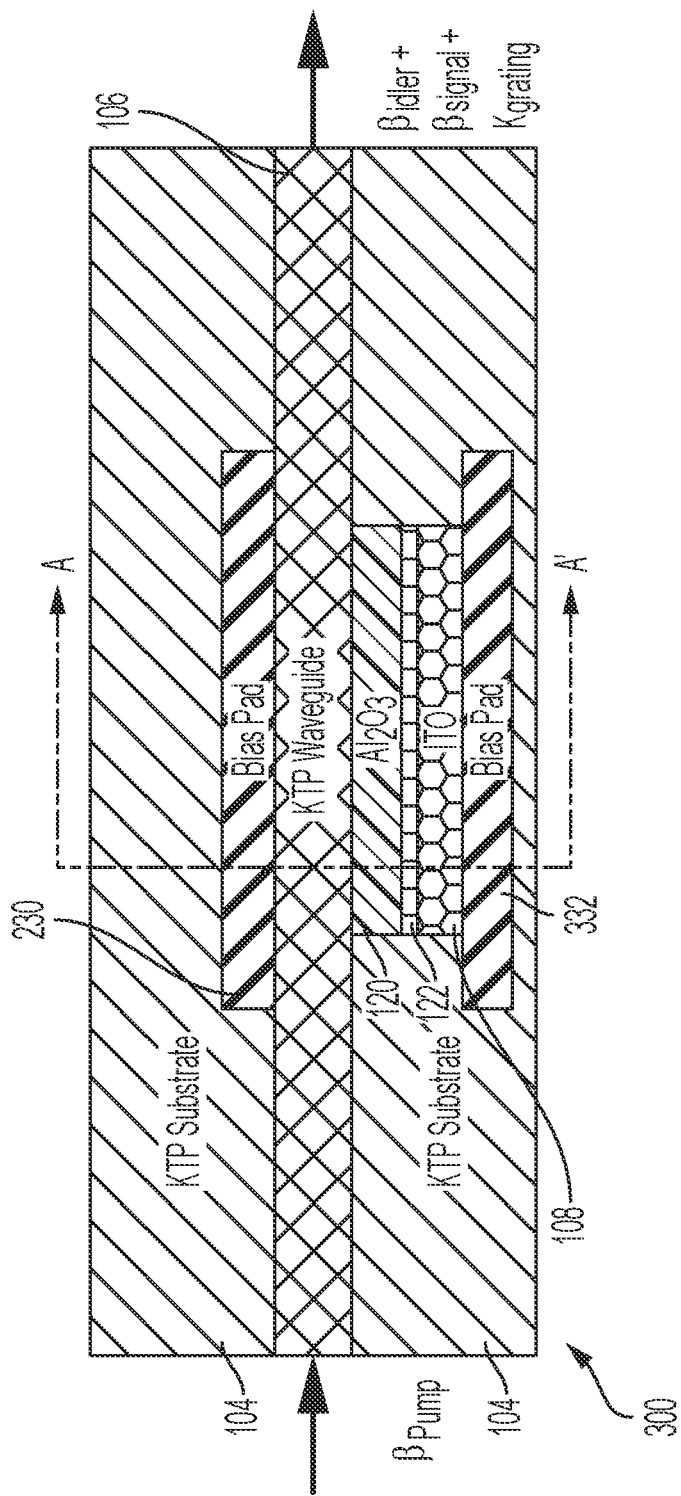
FIG. 3A is a top view, and FIG. 3B a corresponding side view taken along line A-A' of a third example of a waveguide of nonlinear optical material illustrating an accumulation layer due to the locations of the bias pads, the dielectric spacer, and the tunable permittivity region in relation to the waveguide, according to one embodiment of the present invention.
Figure 3B:
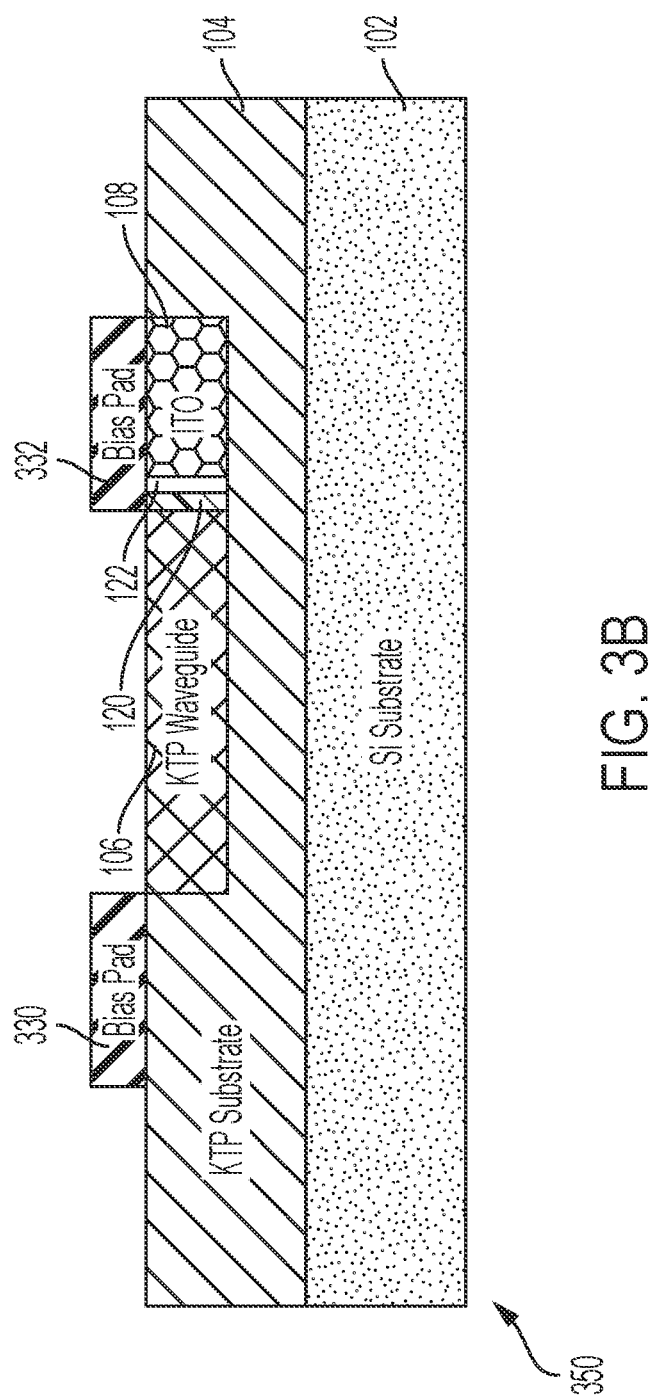

FIG. 3A is a top view 300, and FIG. 3B a corresponding side 350 view taken along line A-A' of a third example of a waveguide of nonlinear optical material illustrating an accumulation layer. The operation principles are identical to those of the first example above. Except in this third example, each of the two bias pads 330, 332, are positioned to extend and overlap the waveguide 106, as shown. The effect of the position of the bias pads on the waveguide changes the formation of the accumulation layer when an external bias voltage is applied.

Fourth Example Configuration of Electro-Optical Modulating Device

Figure 4A:
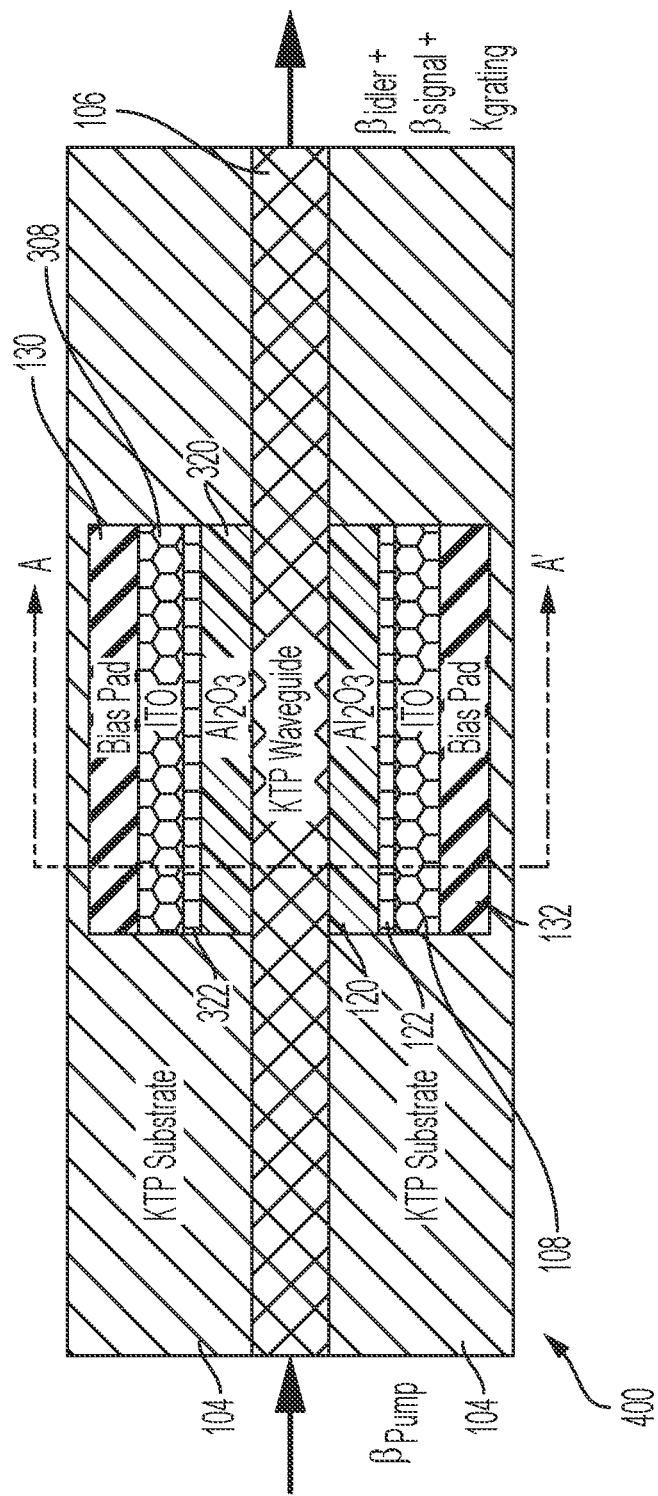
FIG. 4A is a top view, and FIG. 4B a corresponding side view taken along line A-A' of a fourth example of a waveguide of nonlinear optical material illustrating an accumulation layer due to the locations of the bias pads, the dielectric spacer, and the tunable permittivity region in relation to the waveguide, according to one embodiment of the present invention.
Figure 4B:
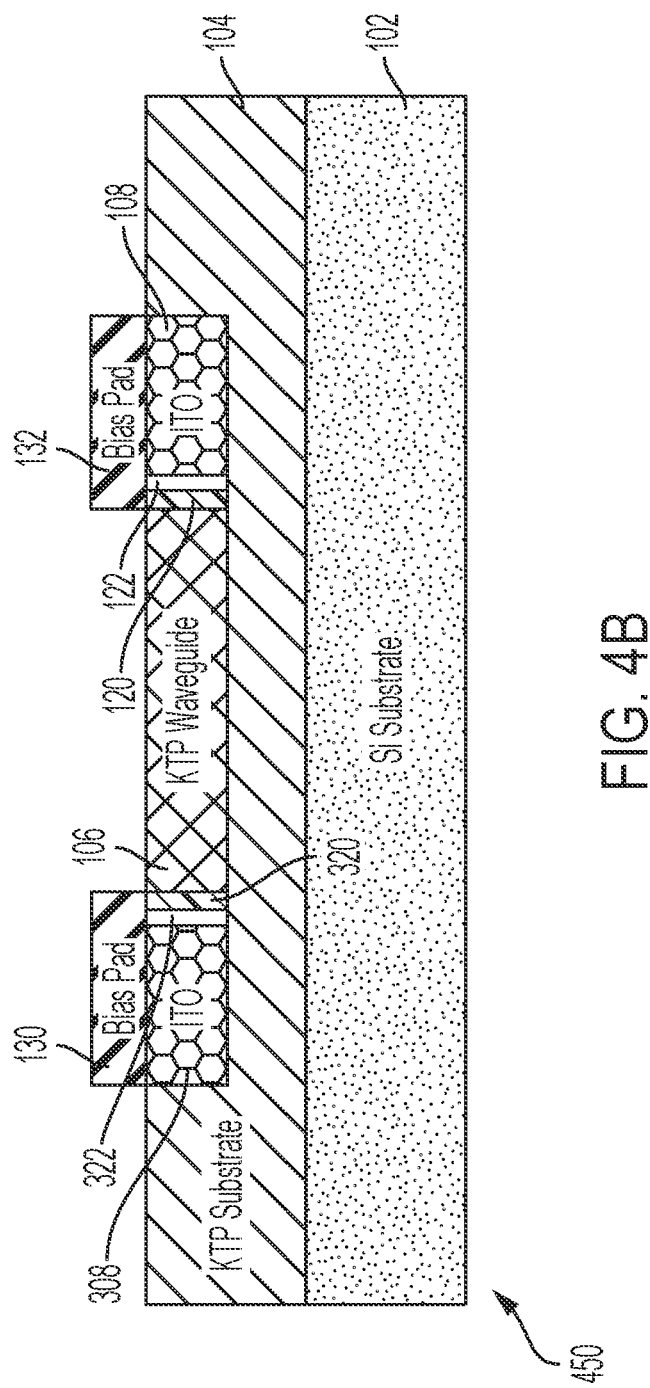

FIG. 4A is a top view 400, and FIG. 4B a corresponding side 450 view taken along line A-A' of a fourth example of a waveguide of nonlinear optical material illustrating an accumulation layer. The operation principles are identical to those of the first example above. Except in this fourth example, there are two tunable permittivity regions 108 and 308, with two corresponding spacers 120, 320 symmetrically disposed along a side of waveguide 106, as shown. Similar to FIG. 1, each of the bias pads 130, 132 are position not to overlap the waveguide 106. Upon the application of the external bias voltage, this results in two accumulation layers being formed 122, 322. The effect of the position of the bias pads on the waveguide changes the formation of the accumulation layer when an external bias voltage is applied.

Fifth Example Configuration of Electro-Optical Modulating Device

Figure 5A:
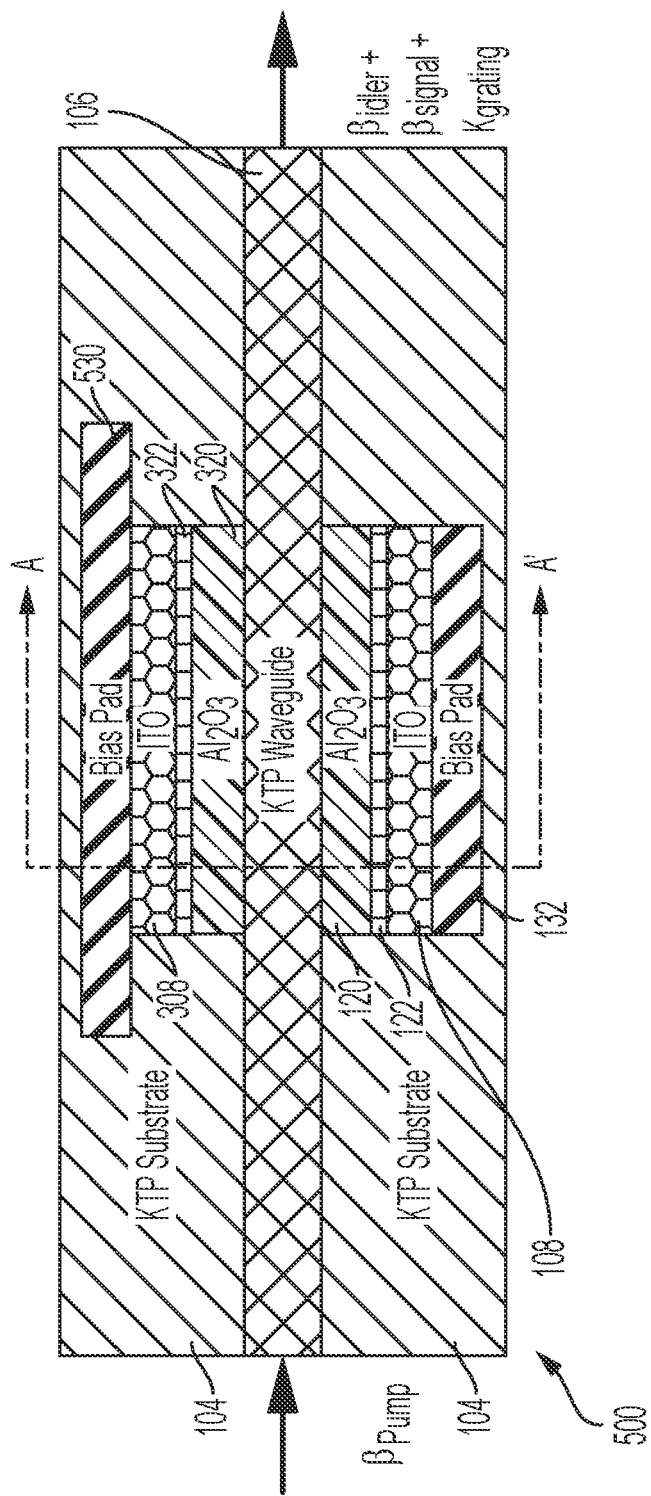
FIG. 5A is a top view, and FIG. 5B a corresponding side view taken along line A-A' of a fifth example of a waveguide of nonlinear optical material illustrating an accumulation layer due to the locations of the bias pads, the dielectric spacer, and the tunable permittivity region in relation to the waveguide, according to one embodiment of the present invention.
Figure 5B:
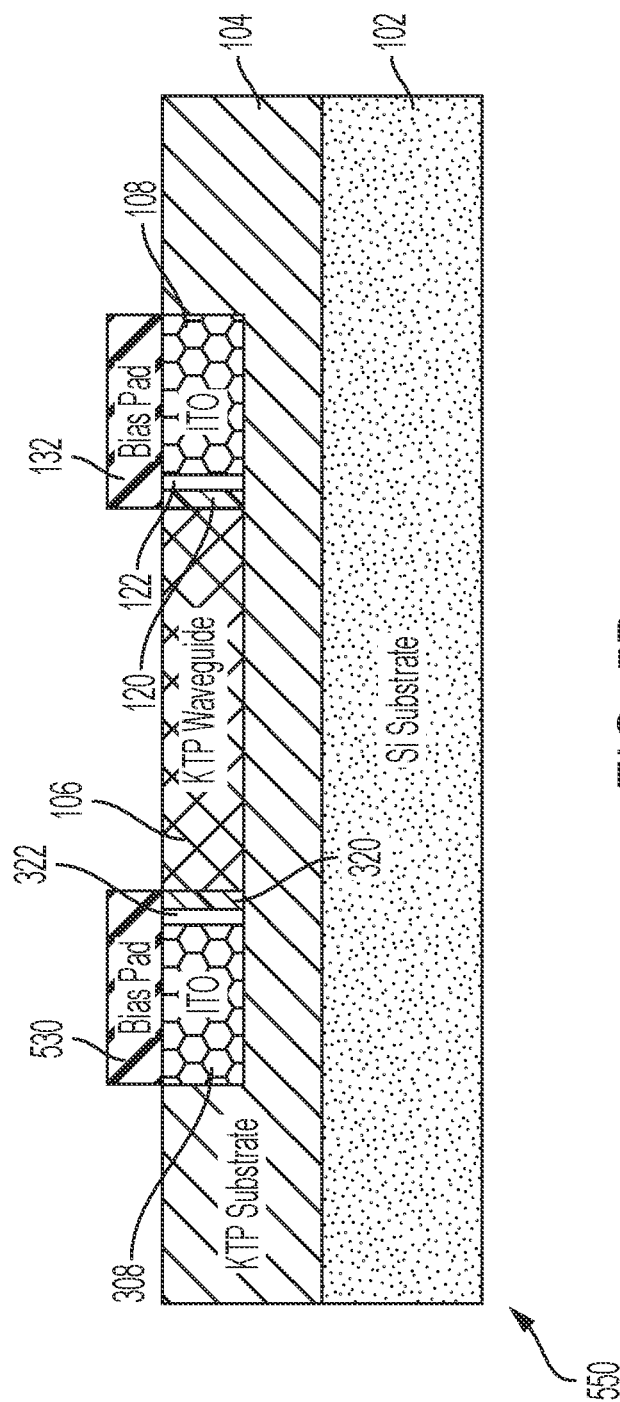

FIG. 5A is a top view 500, and FIG. 5B a corresponding side 550 view taken along line A-A' of a fifth example of a waveguide of nonlinear optical material illustrating an accumulation layer. The operation principles are identical to those of the first example above. Except in this fifth example, there are two tunable permittivity regions 108 and 308 with two corresponding spacers 120, 320 symmetrically disposed along a side of 106, as shown. Similar to FIG. 2, one of the two bias pads 530, is positioned to extend and overlap the waveguide 106, as shown. The other bias pad 132 is positioned not to overlap the waveguide 106. Upon the application of the external bias voltage, this results in two accumulation layers being formed 122, 322. The effect of the position of the bias pads on the waveguide changes the formation of the accumulation layer when an external bias voltage is applied.

Sixth Example Configuration of Electro-Optical Modulating Device

Figure 6A:
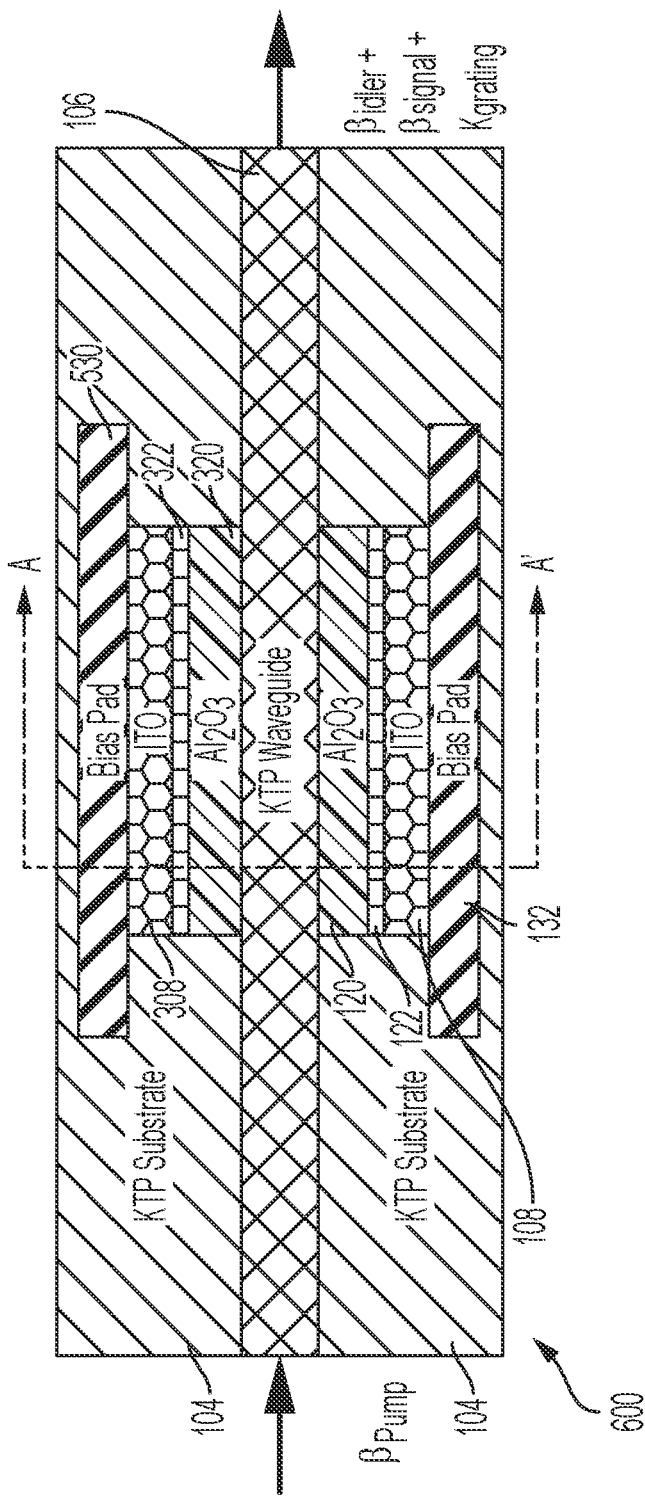
FIG. 6A is a top view, and FIG. 6B a corresponding side view taken along line A-A' of a sixth example of a waveguide of nonlinear optical material illustrating an accumulation layer due to the locations of the bias pads, the dielectric spacer, and the tunable permittivity region in relation to the waveguide, according to one embodiment of the present invention.
Figure 6B:
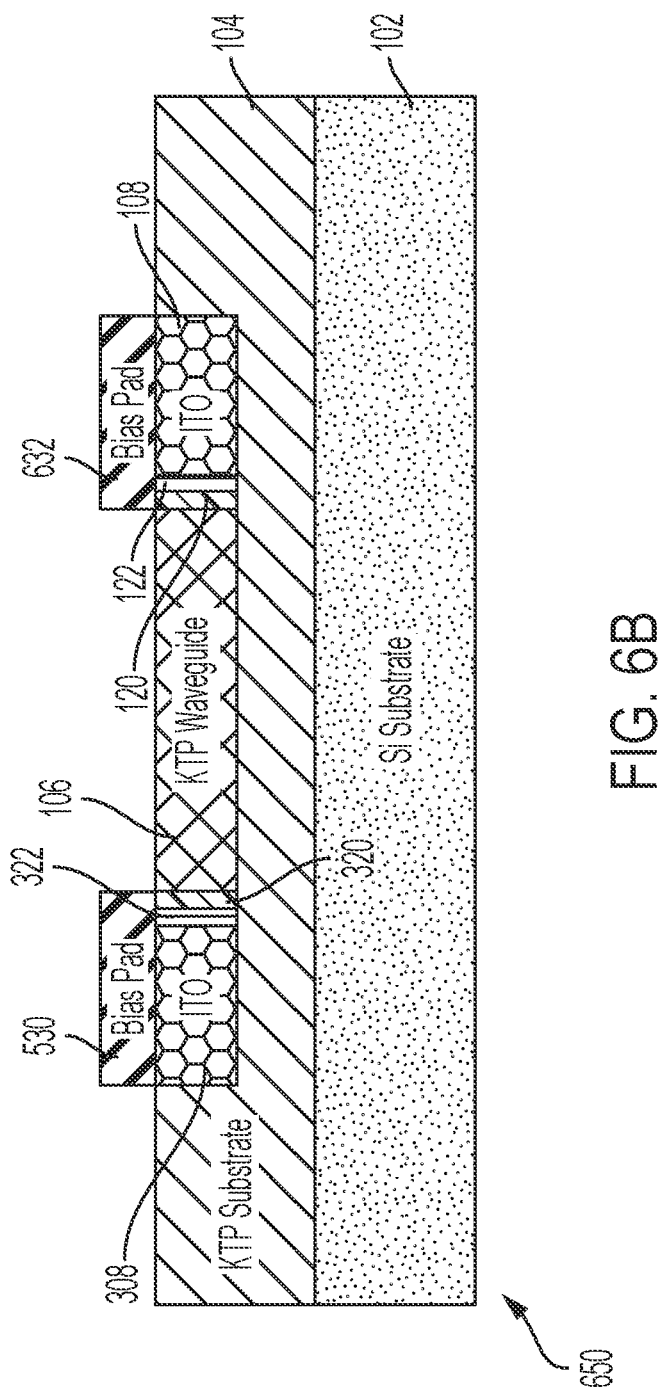

FIG. 6A is a top view 600, and FIG. 6B a corresponding side 650 view taken along line A-A' of a sixth example of a waveguide of nonlinear optical material illustrating an accumulation layer. The operation principles are identical to those of the first example above. Except in this sixth example, there are two tunable permittivity layers 108 and 308 with two corresponding spacers 120, 320 symmetrically disposed along a side of waveguide 106, as shown. Similar to FIG. 3, each of the two bias pads 530, 632 are positioned to extend and overlap the waveguide 106, as shown. Upon the application of the external bias voltage, this results in two accumulation layers being formed 122, 322. The effect of the position of the bias pads on the waveguide changes the formation of the accumulation layer when an external bias voltage is applied.

Seventh Example Configuration of Electro-Optical Modulating Device

Figure 7A:
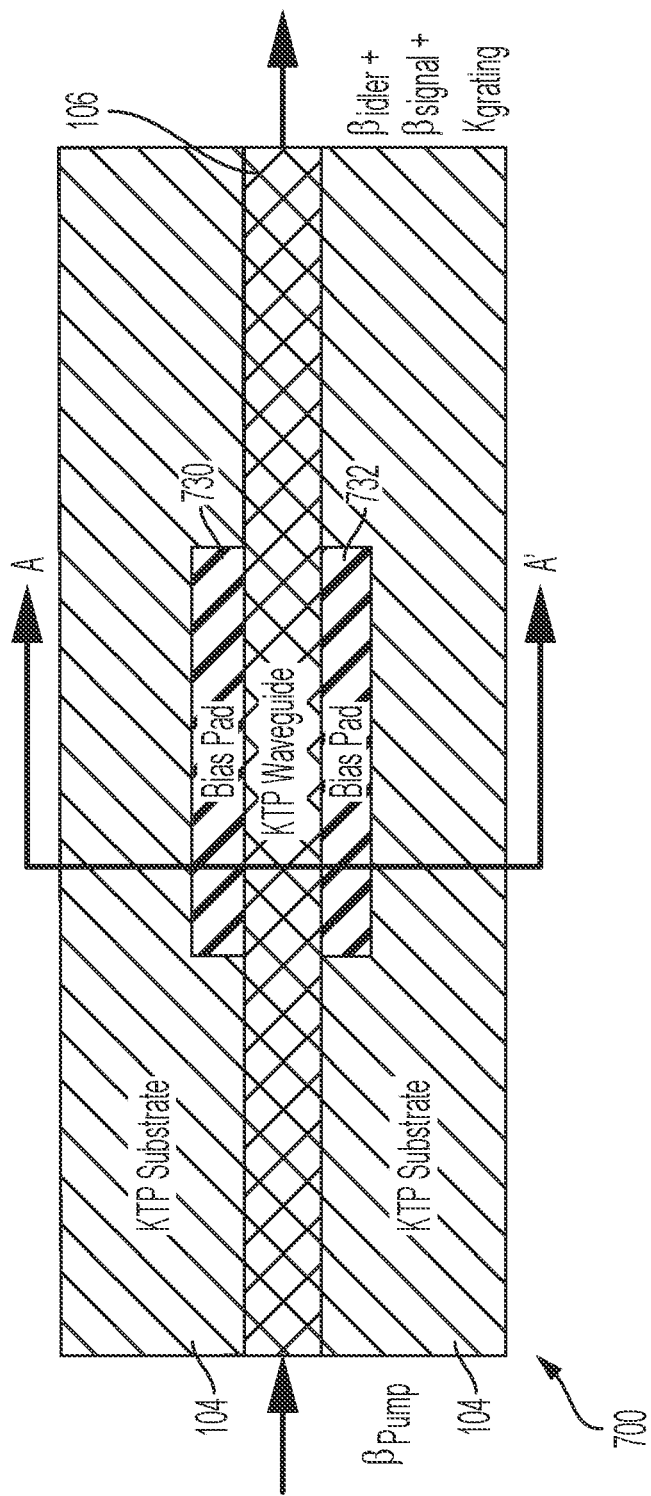
FIG. 7A is a top view, and FIG. 7B a corresponding side view taken along line A-A' of a seventh example of a waveguide of nonlinear optical material illustrating an accumulation layer due to the locations of the bias pads, the dielectric spacer, and the tunable permittivity region in relation to the waveguide, according to one embodiment of the present invention.
Figure 7B:
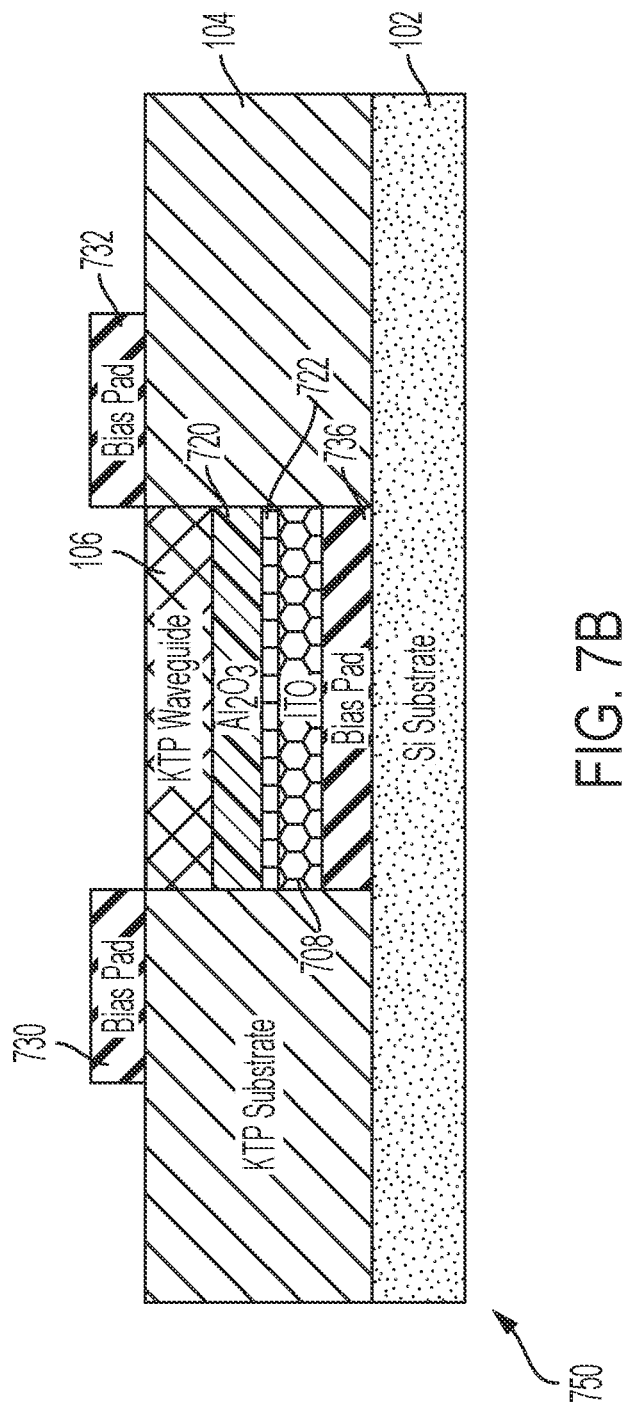

FIG. 7A is a top view 700, and FIG. 7B a corresponding side 750 view taken along line A-A' of a seventh example of a waveguide of nonlinear optical material illustrating an accumulation layer. The operation principles are identical to those of the first example above. Except in this seventh example, there is a single tunable permittivity region 708 and an electrical insulator spacer 720 disposed beneath the waveguide 106, with a third bias pad 708, as shown. Similar to FIG. 1, each of the two bias pads 530, 632 are positioned not to extend and overlap the waveguide 106, as shown. Upon the application of the external bias voltage across all three bias pads 730, 732, and 736, which results in an accumulation layer forming 722. The effect of the position of the bias pads on the waveguide changes the formation of the accumulation layer when an external bias voltage is applied. Depending on the polarity of the external bias voltage, the accumulation/repulsion of electrons will occur thus changing the type of mode that can propagate in the waveguide. It may be that the needed mode can be tuned with a combination of external bias voltages.

Eighth Example Configuration of Electro-Optical Modulating Device

Figure 8A:
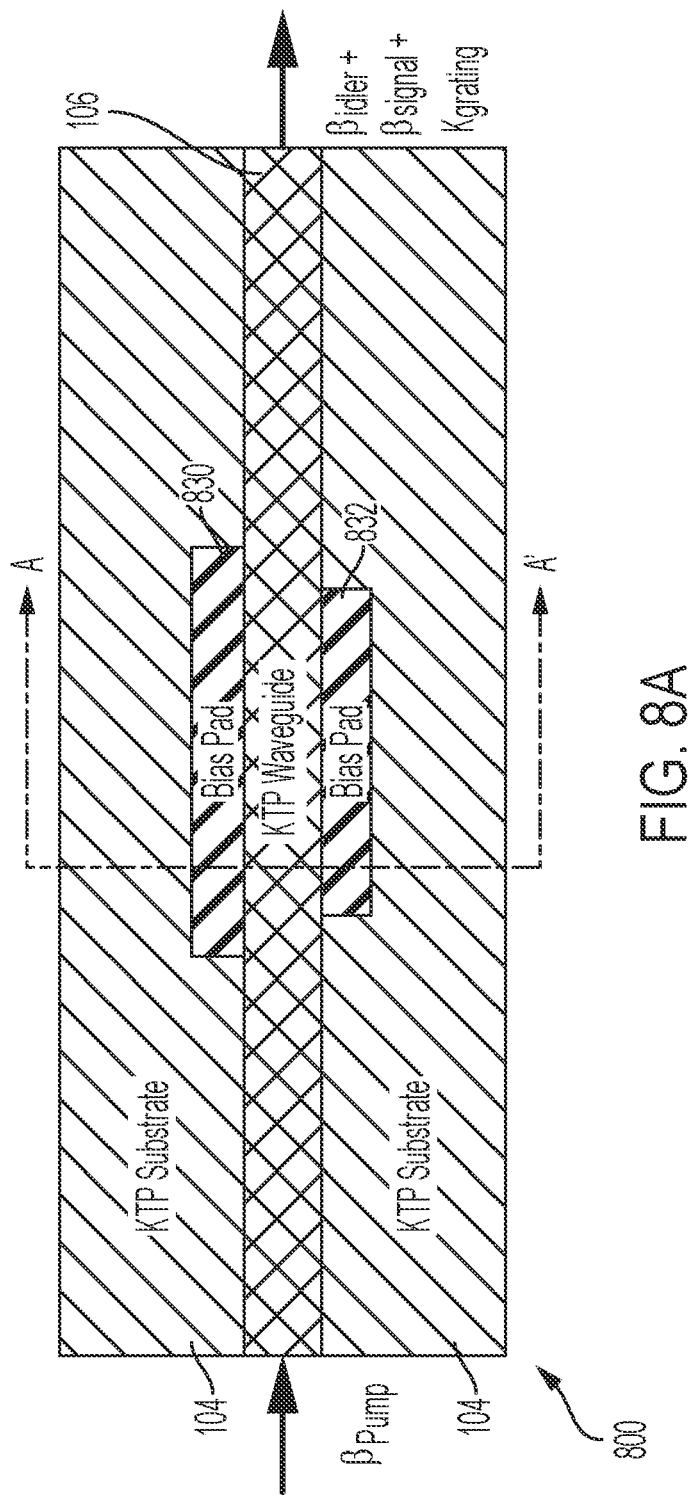
FIG. 8A is a top view, and FIG. 8B a corresponding side view taken along line A-A' of an eighth example of a waveguide of nonlinear optical material illustrating an accumulation layer due to the locations of the bias pads, the dielectric spacer, and the tunable permittivity region in relation to the waveguide, according to one embodiment of the present invention.
Figure 8B:
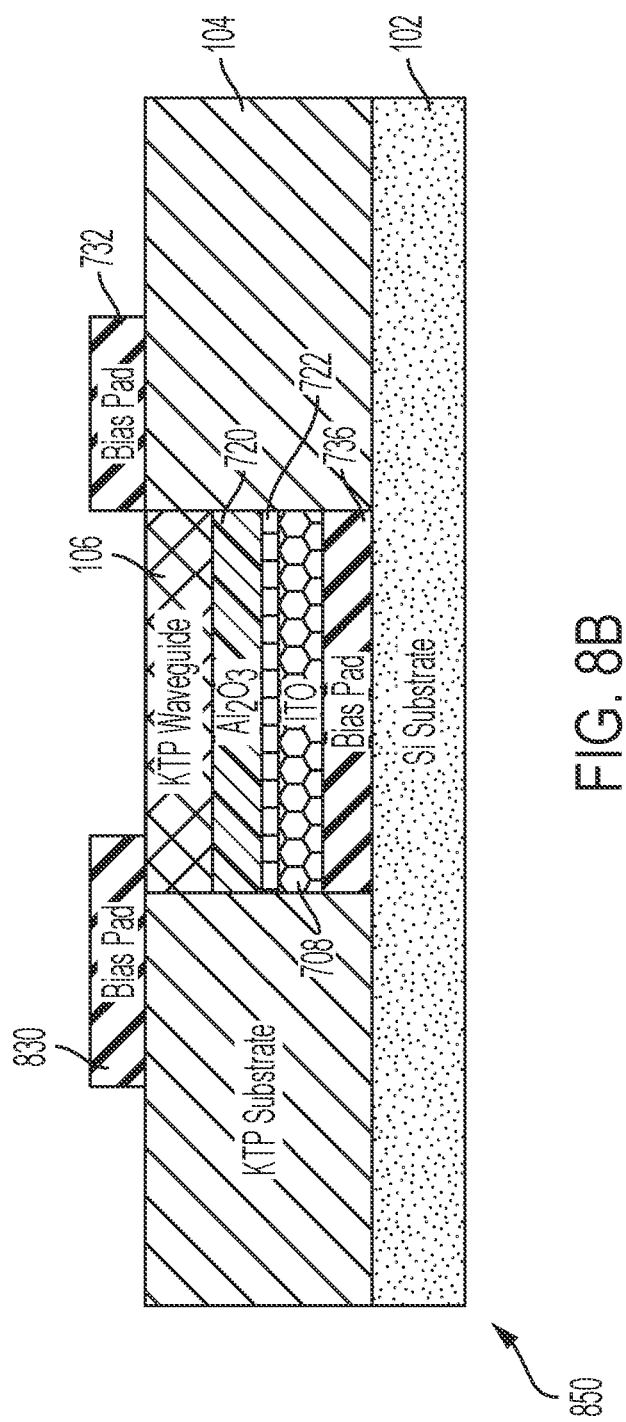

FIG. 8A is a top view 800, and FIG. 8B a corresponding side 850 view taken along line A-A' of an eighth example of a waveguide of nonlinear optical material illustrating an accumulation layer. The operation principles are identical to those of the first example above. Except in this eighth example, there is a single tunable permittivity region 708 and an electrical insulator spacer 720 disposed beneath the waveguide 106 with a third bias pad 736, as shown. Similar to FIG. 2, one of the three bias pads 830, is positioned to extend and overlap the waveguide 106, as shown. The other bias pad 132 is positioned not to overlap the waveguide 106. Upon the application of the external bias voltage across all three bias pads 730, 732, 736, this results in an accumulation layer being formed 722. The effect of the position of the bias pads on the waveguide changes the formation of the accumulation layer when an external bias voltage is applied.

Ninth Example Configuration of Electro-Optical Modulating Device

Figure 9A:
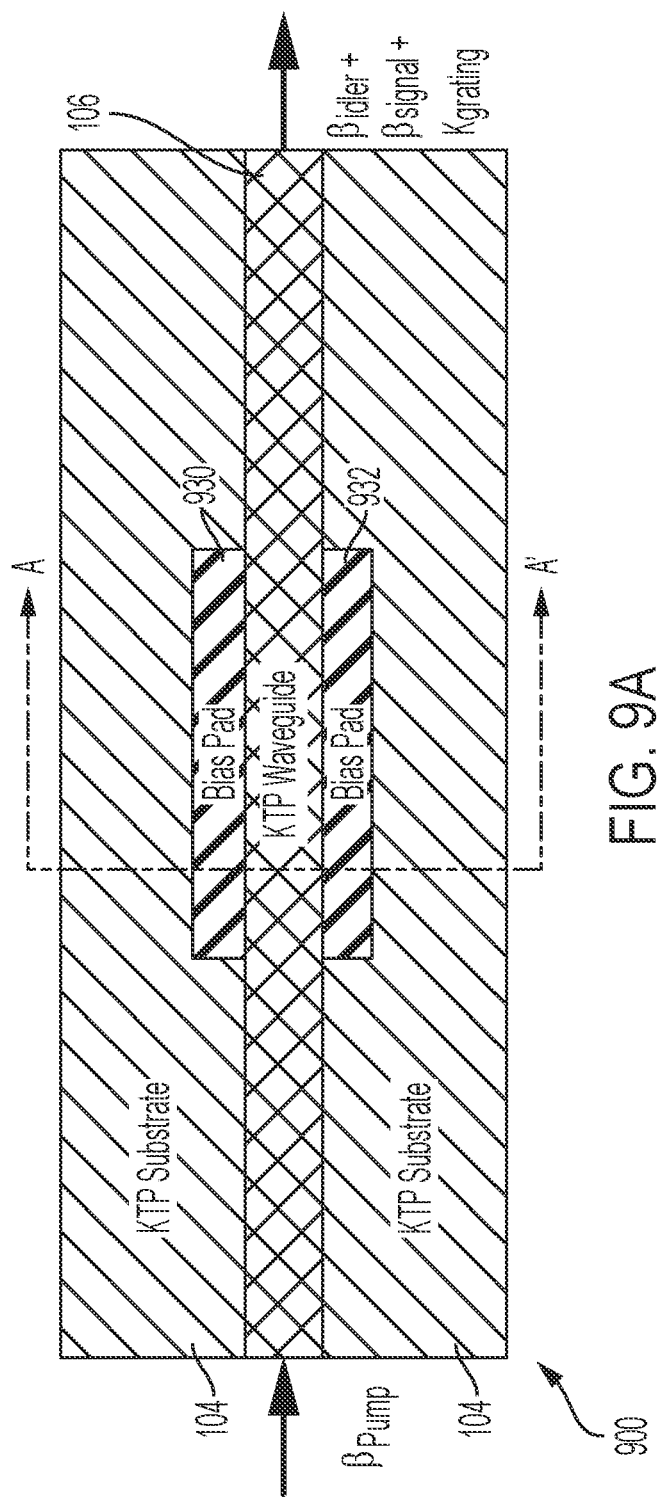
FIG. 9A is a top view, and FIG. 9B a corresponding side view taken along line A-A' of a ninth example of a waveguide of nonlinear optical material illustrating an accumulation layer due to the locations of the bias pads, the dielectric spacer, and the tunable permittivity region in relation to the waveguide, according to one embodiment of the present invention.
Figure 9B:
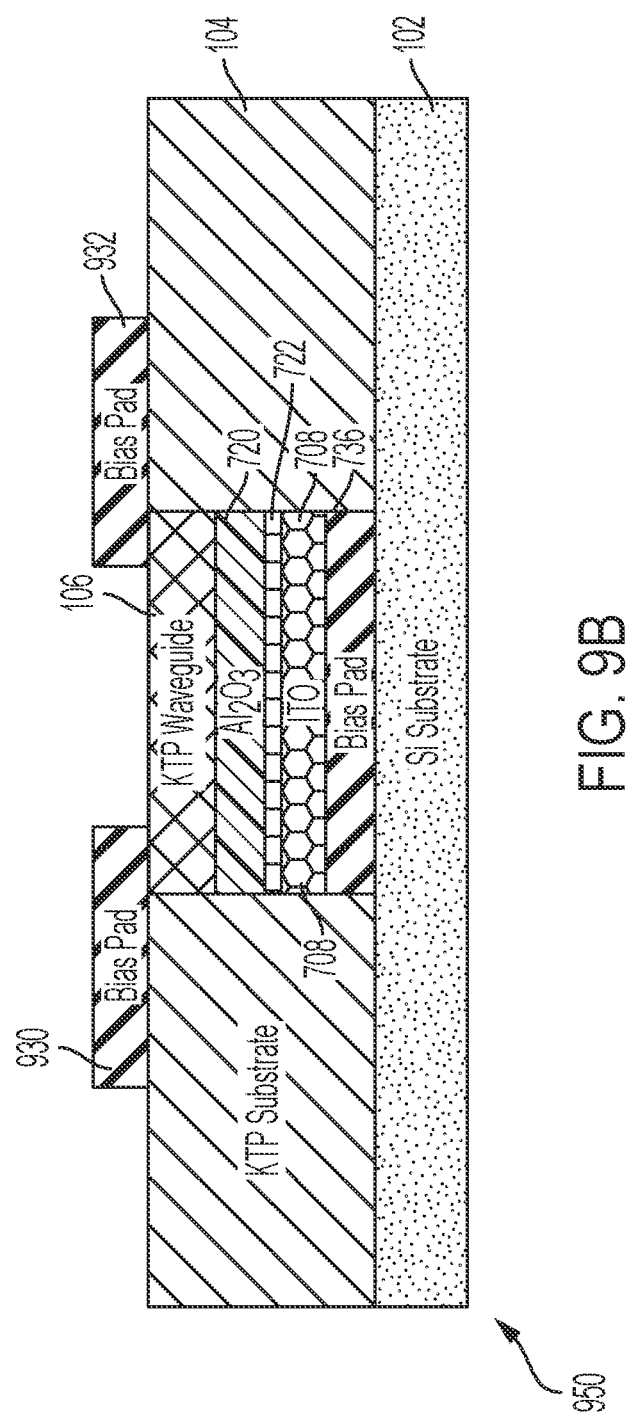

FIG. 9A is a top view 900, and FIG. 9B a corresponding side 950 view taken along line A-A' of a ninth example of a waveguide of nonlinear optical material illustrating an accumulation layer. The operation principles are identical to those of the first example above. Except in this ninth example, there is a single tunable permittivity region 708 and an electrical insulator spacer 720 disposed beneath the waveguide 106 with a third bias pad 736, as shown. Similar to FIG. 3, two of the two bias pads 930, 932, are positioned to extend and overlap the waveguide 106, as shown. Upon the application of the external bias voltage across all three bias pads 930, 932, 736, this results in an accumulation layer being formed 722. The effect of the position of the bias pads on the waveguide changes the formation of the accumulation layer when an external bias voltage is applied.

Simulation of the Electro-Optical Modulating Device

Figure 10:
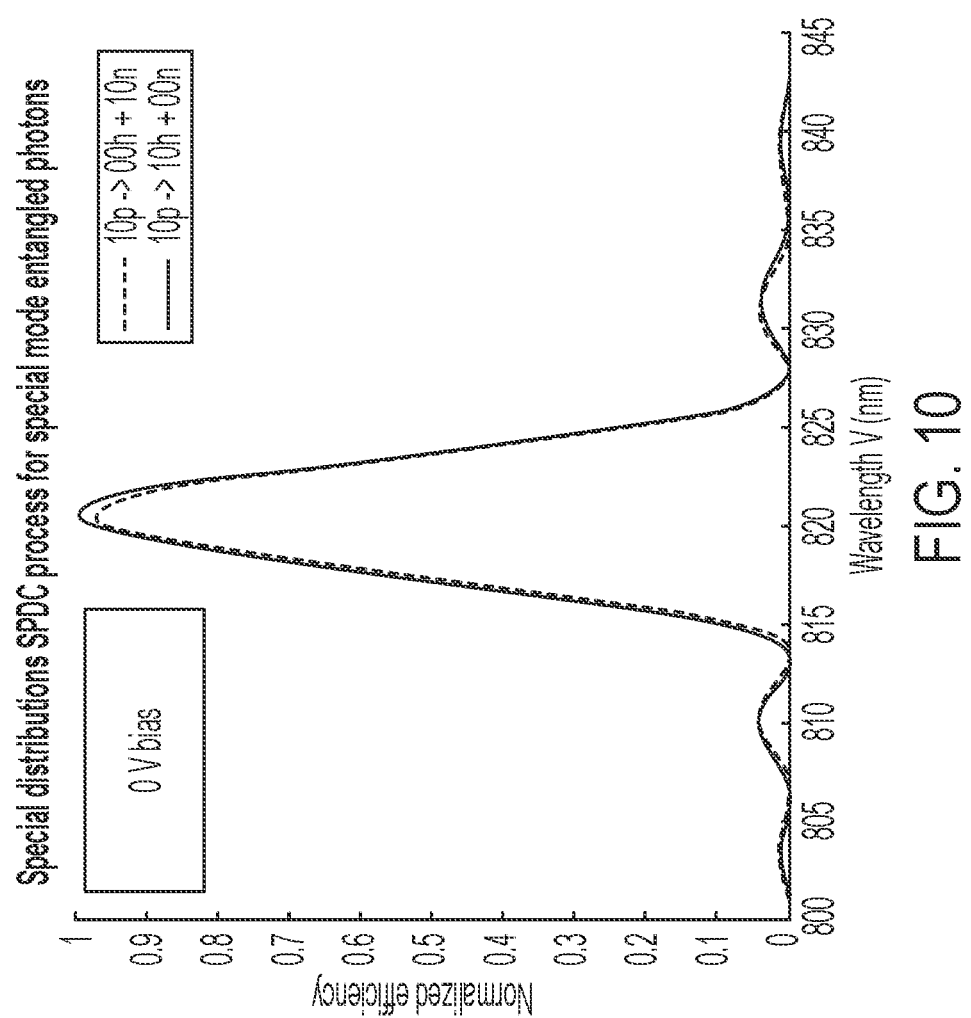
FIG. 10 is a simulated graph illustrating the efficiency versus wavelength of the spectral distribution SPDC process for spatial mode entangled photons at 0V bias, according to one embodiment of the present invention.

FIG. 10 is a simulated graph showing the variation of the generation efficiency of the photon pair versus wavelength of the spectral distribution SPDC process for spatial mode entangled photons at 0V bias, according to one embodiment of the present invention. The center wavelength is approximately 820 nanometers.

Figure 11:
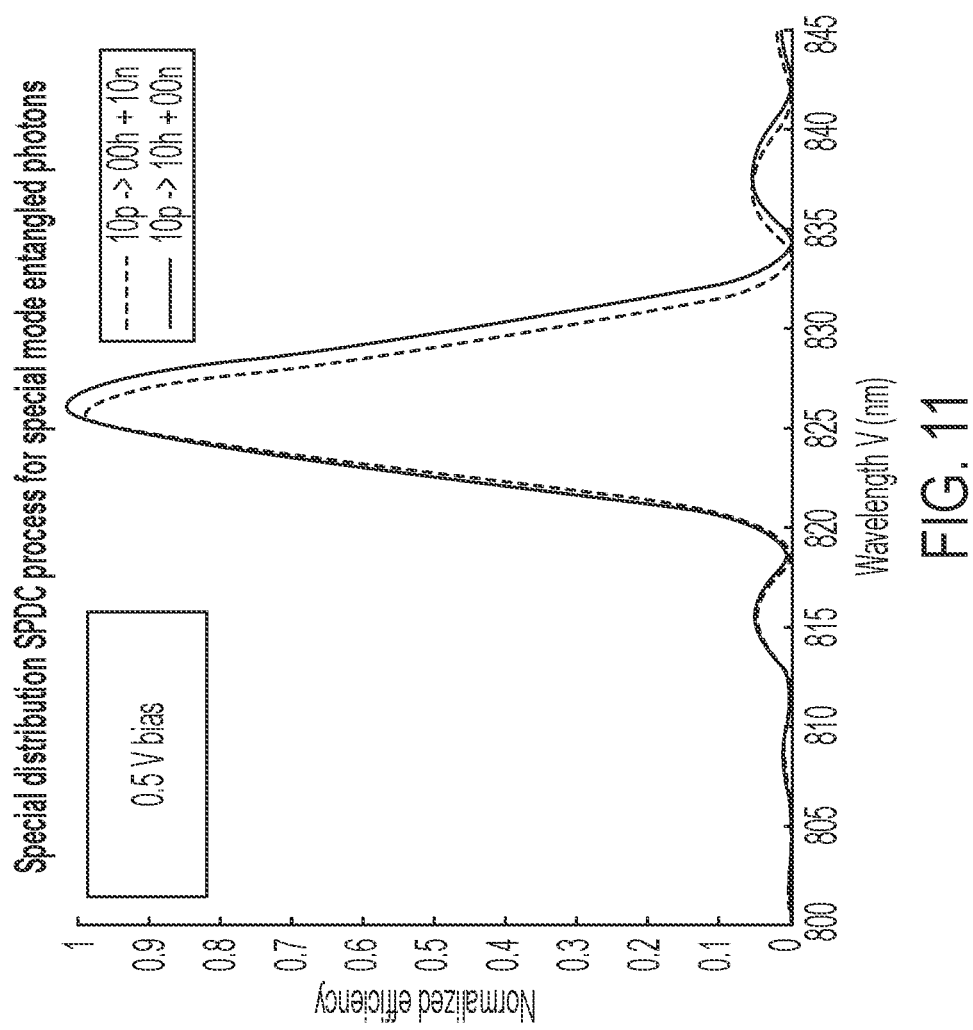
FIG. 11 is a graph of simulating the efficiency versus wavelength of the spectral distribution SPDC process for spatial mode entangled photons at 0.5V bias, according to one embodiment of the present invention.

In the electro-optical modulating device, the wavelength tunability can be achieved with less than 5V applied to the electrodes and at the same time maintaining high efficiency across a broad band of pump, signal, and idler wavelengths. For example, turning to FIG. 11 is a simulation of the efficiency versus wavelength of the spectral distribution the SPDC process for spatial mode entangled photons at 0.5 V bias voltage, according to one embodiment of the present invention. At approximately 0.5 V bias voltage, the center frequency has moved from approximately 820 nanometers to approximately 825 nanometers, showing tunability.

Example Fabrication Process of Electro-Optical Modulating Device

Figure 12:
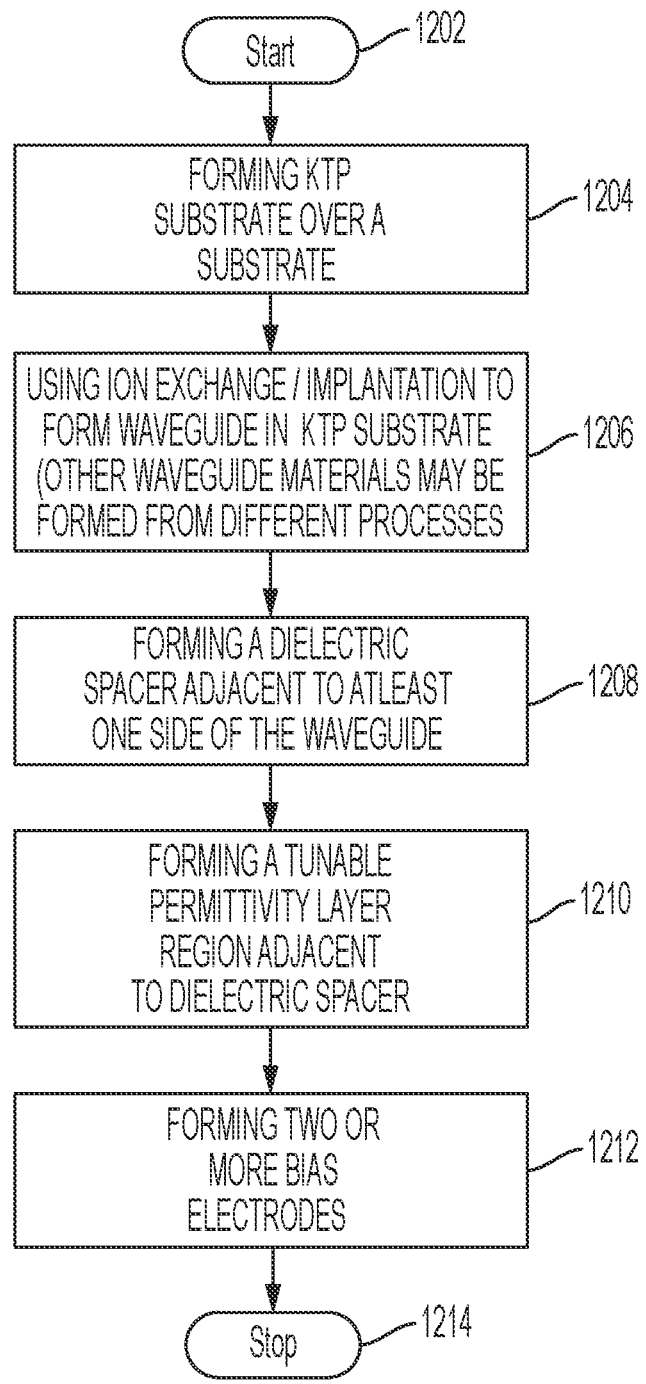
FIG. 12 is an operational flow diagram illustrating one example of a process for forming an electro-optical modulating device, according to one embodiment of the present invention.

FIG. 12 is an operational flow diagram illustrating one example of a process for forming an electro-optical modulating device of the structures shown in FIG. 1 through FIG. 9 above, according to one embodiment of the present invention.

The process begins in step 1202 and immediately proceeds to step 1204. In step 1204 in which a substrate 104 is disposed over a base substrate 102 such as silicon (Si), gallium nitride (GaN), sapphire, indium gallium nitride (InGaN), aluminum indium gallium nitride (AlInGaN) or a combination thereof. The substrate 104 may be made from potassium titanyl phosphate (KTP), potassium dihydrogen phosphate (KDP), lithium niobate ($LiNbO_3$), or a combination thereof is placed over a silicon substrate 102. The substrate 104 is preferably cut in the tangential direction by X and has any thickness, such as 20 μm. The process continues to step 1206.

In step 1206, a waveguide 106 of nonlinear optical material is produced from the substrate 104 in potassium titanyl phosphate (KTiOPO4 or KTP) by ion exchange. Other wave guide materials such as $LiNbO_3$ are formed from a thin slice bound to the substrate 102. The waveguide 106 may be produced in pure RbNO3 at 340° C. for 45 min, and subsequently ion implantation with 500 keV O ions at a dose of 1×1015 ions cm-2. The process continues to step 1208.

In step 1208, the dielectric spacer may then be deposited and patterned adjacent to at least one side of the waveguide 106. For example, a high-k dielectric film 120, such as, hafnium oxide (HfO$_2$), magnesium oxide (MgO), silicon dioxide (SiO$_2$), or aluminum oxide Al$_2$O$_3$ of approximately 5 nm or greater may be sputter deposited or deposited using atomic layer deposition (ALD) or electron beam or thermal deposition. The high-K film 120 may be patterned using a mask. The high-k film 120 could optionally be annealed. The process continues to step 1210.

In step 1210, at least one tunable permittivity region 108 of an optically transparent and weakly electrically conductive material, such as Indium Tin Oxide (ITO), is formed adjacent to a side of the dielectric spacer that is opposite the waveguide 106 and underneath the surface of the substrate 104. Each tunable permittivity region 108 is 0.05-8 µm-thick and is so sized to approximate the thickness of the waveguide 106, depending on the overall geometry and footprint. The process continued to step 1212.

In step 1212, two or more bias electrodes or bias pads 130, 132 may then be formed and patterned over the dielectric spacer 120 and the tunable permittivity region 108. For example, the bias pads 130, 132 may be formed from gold (Au), platinum (Pt), silver (Ag), copper (Cu), aluminum (Al), Tantalum nitride (TaN) or a combination thereof. In one example, the bias electrodes 130, 132 are the same length and width as the dielectric spacer 120 and the tunable permittivity region 108 and formed above them. In another example, the bias electrodes 130, 132 are longer in length and/or width to extend not only over the dielectric spacer 120 and the tunable permittivity region 108 but portions of the waveguide as well. The various configurations of the bias pads, the dielectric spacer, and the tunable permittivity region in relation to the waveguide that produces an accumulation in response to an external bias voltage layer are shown in FIG. 2 through FIG. 9 above. The process completes in step 1214.

Other items such as vias (not shown) may be formed through the substrate 104 to electrically connect bias electrodes formed beneath the waveguide 106.

Non-Limiting Review of Semiconductor Device Descriptions

It is to be understood that the present invention is described in terms of a given illustrative architecture; however, other architectures, structures, substrate materials and process features and steps may be varied within the scope of the present invention.

The present invention may include a design for an integrated circuit chip, which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods, as described herein, may be used in the fabrication of integrated circuit chips. The resulting integrated circuit chips can be distributed by the fabricator in raw wafer form (that is, as a single wafer that has multiple unpackaged chips), as a bare die, or in a packaged form. the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It is to be understood that the various layers and/or regions shown in the accompanying drawings are not drawn to scale, and that one or more layers and/or regions of a type commonly used in semiconductor devices may not be explicitly shown in a given drawing. This does not imply that the layers and/or regions not explicitly shown are omitted from the actual devices. In addition, certain elements may be left out of particular views for the sake of clarity and/or simplicity when explanations are not necessarily focused on the omitted elements.

Deposition may be any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD), among others.

Removal may be any process that removes material from the wafer; examples include etch processes (either wet or dry) and chemical-mechanical planarization (CMP).

Patterning refers to the shaping or altering of deposited materials and is generally referred to as lithography. For example, in conventional lithography, the wafer is coated with a chemical called a photoresist; then, a machine called a stepper focuses, aligns, and moves a mask, exposing select portions of the wafer below to short wavelength light; the exposed regions are washed away by a developer solution. After etching or other processing, the remaining photoresist is removed by plasma ashing.

Modification of electrical properties has historically entailed doping transistor sources and drains (originally by diffusion furnaces and later by ion implantation). These doping processes are followed by furnace annealing or, in advanced devices, by rapid thermal annealing (RTA); annealing serves to activate the implanted dopants. Modification of electrical properties now also extends to the reduction of a material's dielectric constant in low-k insulators trench exposure to ultraviolet light in UV processing (UVP). Modification is frequently achieved by oxidation, which can be carried out to create semiconductor-insulator junctions, such as in the local oxidation of silicon (LOCOS) to fabricate metal oxide field effect transistors.

NON-LIMITING EXAMPLES

Although specific embodiments of the invention have been discussed, those having ordinary skill in the art will understand that changes can be made to the specific embodiments without departing from the scope of the invention. The scope of the invention is not to be restricted, therefore, to the specific embodiments, and it is intended that the appended claims cover any and all such applications, modifications, and embodiments within the scope of the present invention.

It should be noted that some features of the present invention may be used in one embodiment thereof without use of other features of the present invention. As such, the foregoing description should be considered as merely illustrative of the principles, teachings, examples, and exemplary embodiments of the present invention, and not a limitation thereof.

Also, these embodiments are only examples of the many advantageous uses of the innovative teachings herein. In general, statements made in the specification of the present application do not necessarily limit any of the various claimed inventions. Moreover, some statements may apply to some inventive features but not to others.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

INCORPORATED REFERENCES

The following publications and other references listed in the Information Disclosure are hereby incorporated by reference in their entirety:

[1] J. Wang, F. Sciarrino, A. Laing and M. G. Thompson, "Integrated photonic quantum technologies," *Nature Photonics*, pp. 273-284, 2020.

[2] K. Sanaka, K. Kawahara and T. Kuga, "New high-efficiency source of photon pairs for engineering quantum entanglement," *Physical Review Letters*, vol. 86, pp. 5620-5623, 2001.

[3] K. Banaszek, A. B. Uren and I. A. Walmsley, "Generation of correlated photons in controlled spatial modes by downconversion in nonlinear waveguides," *Optics Letters*, vol. 26, pp. 1367-1369, 2001.

[4] A. Martin, V. Cristofori, P. Aboussouan, Hermann, W. Sohler, D. Ostrowsky, O. Alibart and S. Tanzili, "Integrated optical source of polarization entangled photons at 1310 nm," *Optics Express*, vol. 17, pp. 1033-1041, 2009.

[5] J. Brendel, N. Gisin, W. Tittel and H. Zbinden, "Pulsed energy-time entangled twin-photon source for quantum communication," *Physical Review Letters*, vol. 82, pp. 2594-2597, 1999.

[6] S. Tanzili, W. Tittel, H. De Riedmatten, H. Zbinden, P. Baldi, M. DeMicheli, D. B. Ostrowsky and N. Gisin, "PPLN waveguide for quantum communication," *European Physics Journal D*, vol. 18, pp. 155-160, 2002.

[7] D. Bharadwaj, K. Thyagarajan, M. Jachura, M. Karpinski and K. Banaszek, "Scheme for on-chip verification of transverse mode entanglement using the electro-optic effect," *Optics Express*, vol. 23, pp. 33087-33098, 2015.

[8] S. Han, S. Kim, S. Kim, T. Low, V. Brar and M. S. Jang, "Complete complex amplitude modulation with electrically tunable graphene plasmonic metamolecules," *ACS Nano*, vol. 14, pp. 1166-1175, 2020.

[9] O. Buchnev, N. Podoliak, M. Kaczmarek, N. I. Zheludev and V. A. Fedotov, "Electrically controlled nanostructured metasurface loaded with liquid crystal: towards multifunctional photonic switch," *Advanced Optical Materials*, vol. 3, pp. 674-679, 2015.

[10] M. J. Dicken, K. Aydin, I. M. Pryce, L. A. Sweatlock, E. M. Boyd, S. Walavalkar, J. Ma and H. A. Atwater, "Frequency tunable nearinfrared metamaterials based on VO2 phase transition," *Optics Express*, vol. 17, pp. 18330-18339, 2009.

[11] K. Thyagarajan, R. Sokhoyan, L. Zornberg and H. A. Atwater, "Millivolt modulation of plasmonic metasurface optical response via ionic conductance".

[12] Y. W. Huang, H. W. H. Lee, R. Sokhoyan, R. A. Pala, K. Thyagarajan, S. Han, D. P. Tsai and H. A. Atwater, "Gate-tunable conducting oxide metasurfaces," *Nano Letters*, vol. 16, pp. 5319-5325, 2016.

What is claimed is:

1. A method for forming a waveguide for entangled photon pair generation with a tunable wavelength, the method comprising:
    forming a waveguide of a nonlinear optical material with one or more sides and a refractive index defined by a corresponding propagation constant;
    forming a dielectric spacer to surround the one or more sides of the waveguide;
    disposing a tunable permittivity region with a carrier density adjacent to the dielectric spacer; and
    applying an external bias voltage on the tunable permittivity region to change the carrier density and to form one of a charge depletion layer or accumulation layer adjacent to the one or more sides of the waveguide, thereby changing the corresponding propagation constant due to a modulation of the refractive index.

2. The method of claim 1, the method further comprising:
    operating the waveguide at an epsilon-near-zero (ENZ) regime; and
    wherein the changing the corresponding propagation constant is due to a real part of a permittivity of the tunable permittivity region changing polarity and a signal-idler frequency pair satisfies a quasi-phase matching condition.

3. The method of claim 1, wherein the tunable permittivity region is one of a conductive oxide, a transparent conductive oxide, field-effect material, electro-optic material, thermo-optic material, 2D-material, or a combination thereof.

4. The method of claim 3, wherein the tunable permittivity region is one of a transparent conductive oxide (TCO), an indium tin oxide (ITO), an indium zinc oxide (IZO), indium zinc oxide (IVO) zinc oxide an aluminum zinc oxide (AZO), a gallium zinc oxide (GZO), an aluminum gallium zinc oxide (AGZO), a gallium indium zinc oxide (GIZO), a transition metal nitride including Titanium nitride (TiN), Zirconium nitride (ZrN), Hafnium Nitride (HfN), and Tantalum nitride (TaN), or a combination thereof.

5. The method of claim 1, further comprising:
    generating entangled photon pairs from pump photons to pass through the waveguide; and
    applying the generated entangled photon pairs to one of quantum sensing, communication, computing, encryption or a combination thereof.

6. The method of claim 1, further comprising:
generating entangled photon pairs from pump photons to pass through the waveguide, wherein the entangled photon pairs includes one of second-harmonic generation, third-harmonic generation, high-harmonic generation, or a combination thereof.

7. The method of claim 1, wherein the applying an external bias voltage on the tunable permittivity region to change the carrier density includes tunable permittivity region with various dielectric susceptibility.

8. The method of claim 1, further comprising:
generating entangled photon pairs from pump photons to pass through the waveguide, wherein the entangled photon pairs are entangled based on a spatial-mode, a polarization, frequency-time, energy-time, hyper-entanglement, angular momentum, a quadrature or a combination thereof.

9. The method of claim 1, wherein the waveguide is one of potassium titanyl phosphate (KTP), potassium dihydrogen phosphate (KDP), lithium niobate (LN), or a combination thereof or any other nonlinear optical medium.

10. The method of claim 1, further comprising:
generating entangled photon pairs from pump photons to pass through the waveguide at a given wavelength.

11. An electro-optical modulating device comprising:
a waveguide of a nonlinear optical material with one or more sides and a refractive index defined by a corresponding propagation constant;
a dielectric spacer to surround the one or more sides of the waveguide; and
a tunable permittivity region with a carrier density adjacent to the dielectric spacer in which a carrier density changes based on application of an electric field to form one of a charge depletion layer or accumulation layer adjacent to the one or more sides of the waveguide, thereby changing the corresponding propagation constant due to a modulation of the refractive index.

12. The electro-optical modulating device of claim 11, wherein the changing the corresponding propagation constant is due to a real part of a permittivity of the tunable permittivity region changing polarity and a signal-idler frequency pair satisfies a quasi-phase matching condition when operating the waveguide at an epsilon-near-zero (ENZ) regime.

13. The electro-optical modulating device of claim 11, wherein the tunable permittivity region is one of a conductive oxide, a transparent conductive oxide, field-effect material, electro-optic material, thermo-optic material, 2D-material, or a combination thereof.

14. The electro-optical modulating device of claim 13, wherein the tunable permittivity region is one of a transparent conductive oxide (TCO), an indium tin oxide (ITO), an indium zinc oxide (IZO), indium zinc oxide (IVO) zinc oxide an aluminum zinc oxide (AZO), a gallium zinc oxide (GZO), an aluminum gallium zinc oxide (AGZO), a gallium indium zinc oxide (GIZO), a transition metal nitride including Titanium nitride (TiN), Zirconium nitride (ZrN), Hafnium Nitride (HfN), and Tantalum nitride (TaN), or a combination thereof.

15. The electro-optical modulating device of claim 11, further comprising:
a light emitting structure disposed adjacent to the waveguide that generates entangled photon pairs from pump photons to pass through the waveguide for use with one of quantum sensing, communication, computing, encryption or a combination thereof.

16. The electro-optical modulating device of claim 11, further comprising:
a light emitting structure disposed adjacent to the waveguide that generates entangled photon pairs from pump photons to pass through the waveguide, wherein the entangled photon pairs includes one of second-harmonic generation, third-harmonic generation, high-harmonic generation, or a combination thereof.

17. The electro-optical modulating device of claim 11, wherein the tunable permittivity region includes various dielectric susceptibility.

18. The electro-optical modulating device of claim 11, further comprising:
a light emitting structure disposed adjacent to the waveguide that generates entangled photon pairs from pump photons to pass through the waveguide, wherein the entangled photon pairs are entangled based on a spatial-mode, a polarization, frequency-time, energy-time, hyper-entanglement, angular momentum, a quadrature or a combination thereof.

19. The electro-optical modulating device of claim 11, wherein the waveguide is one of potassium titanyl phosphate (KTP), potassium dihydrogen phosphate (KDP), lithium niobate (LN), or a combination thereof or any other nonlinear optical medium.

20. The electro-optical modulating device of claim 11, further comprising:
a light emitting structure disposed adjacent to the waveguide that generates entangled photon pairs from pump photons to pass through the waveguide, wherein the entangled photon pairs at a given wavelength.

* * * * *